US011576244B2

United States Patent
Maeda

(10) Patent No.: US 11,576,244 B2
(45) Date of Patent: Feb. 7, 2023

(54) SYSTEM AND METHOD FOR LIGHT FIELD ILLUMINATOR SHEET-BASED DYNAMIC LIGHTING OUTPUT

(71) Applicant: Palo Alto Research Center Incorporated, Palo Alto, CA (US)

(72) Inventor: Patrick Yasuo Maeda, San Jose, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 17/370,338

(22) Filed: Jul. 8, 2021

(65) Prior Publication Data

US 2023/0008961 A1    Jan. 12, 2023

(51) Int. Cl.
| | |
|---|---|
| H05B 47/115 | (2020.01) |
| F21V 5/00 | (2018.01) |
| F21V 7/28 | (2018.01) |
| F21V 23/04 | (2006.01) |
| F21V 7/04 | (2006.01) |
| F21Y 105/16 | (2016.01) |
| F21Y 115/10 | (2016.01) |

(52) U.S. Cl.
CPC ............ *H05B 47/115* (2020.01); *F21V 5/004* (2013.01); *F21V 5/007* (2013.01); *F21V 7/041* (2013.01); *F21V 7/28* (2018.02); *F21V 23/0471* (2013.01); *F21Y 2105/16* (2016.08); *F21Y 2115/10* (2016.08)

(58) Field of Classification Search
CPC ....... H05B 47/115; F21V 5/004; F21V 5/007; F21V 7/28; F21V 7/041; F21V 23/0471
See application file for complete search history.

(56) References Cited

U.S. PATENT DOCUMENTS

2015/0211708 A1*   7/2015   Stavely ............... G02B 3/0056
                                                                     362/231
2017/0374244 A1*  12/2017   Swaminathan ........ G06F 3/017

OTHER PUBLICATIONS

Http://web.archive.org/web/20210421232240/https://en.wikipedia.org/wiki/Solid-state_lighting, cached on Apr. 21, 2021.
(Continued)

*Primary Examiner* — Rajarshi Chakraborty
*Assistant Examiner* — Nathaniel J Lee
(74) *Attorney, Agent, or Firm* — Leonid Kisselev

(57) ABSTRACT

A digitally controlled LED illuminator sheet that produces far-field illumination patterns or light field distributions that increase light utilization and application efficiency. A dynamic directional LEDs (or other kinds of solid-state light sources) sheet is positioned under each lenslet of a microlens array. Individual LED beam pointing direction depends on off-axis position relative to optical axis of lenslet. Individual beams from independent LEDs form illumination pixels at the illumination plane or within a volume space and can be modulated in intensity. Illumination pixels partially overlap in far-field illumination plane and illumination volume. Over a large illumination space many illumination pixels will partially superimposed on neighboring illumination pixels, with the overlap being in increments smaller than the size of a pixel. The LEDs can be digitally turned on or off and/or pulse width or amplitude modulated to produce far-field illumination patterns or light field distributions with spectral efficiency and efficacious intensity.

20 Claims, 30 Drawing Sheets

(56) References Cited

OTHER PUBLICATIONS

Https://www.ndeg.com/media/nth-light-enabling-entirely-new-applications-for-light, "Nth-Light®: Enabling Entirely New Applications for Light," published Jun. 25, 2020.
Http://web.archive.org/web/20210507151948/https://www.fusionoptix.com/category/optics/edge-lit/, cached on May 7, 2021.
Http://web.archive.org/web/20210517042919/https://www.glintlighting.com/, cached on May 17, 2021.
Https://lumileds.com/company/blog/rethinking-tunable-white-lighting-for-mainstream-volume-products/, published Jan. 12, 2021.
Http://web.archive.org/web/20210525001658/https://en.wikipedia.org/wiki/Flexible_organic_light-emitting_diode, cached on May 25, 2021.

* cited by examiner

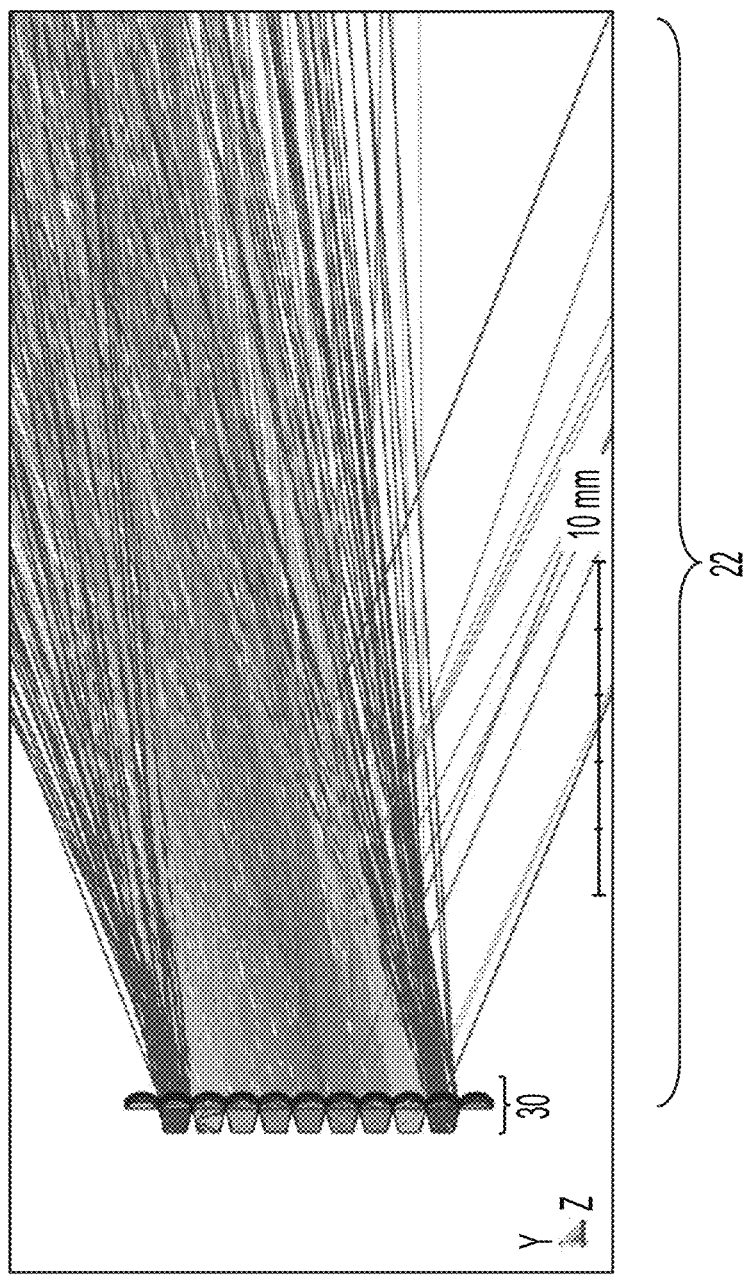

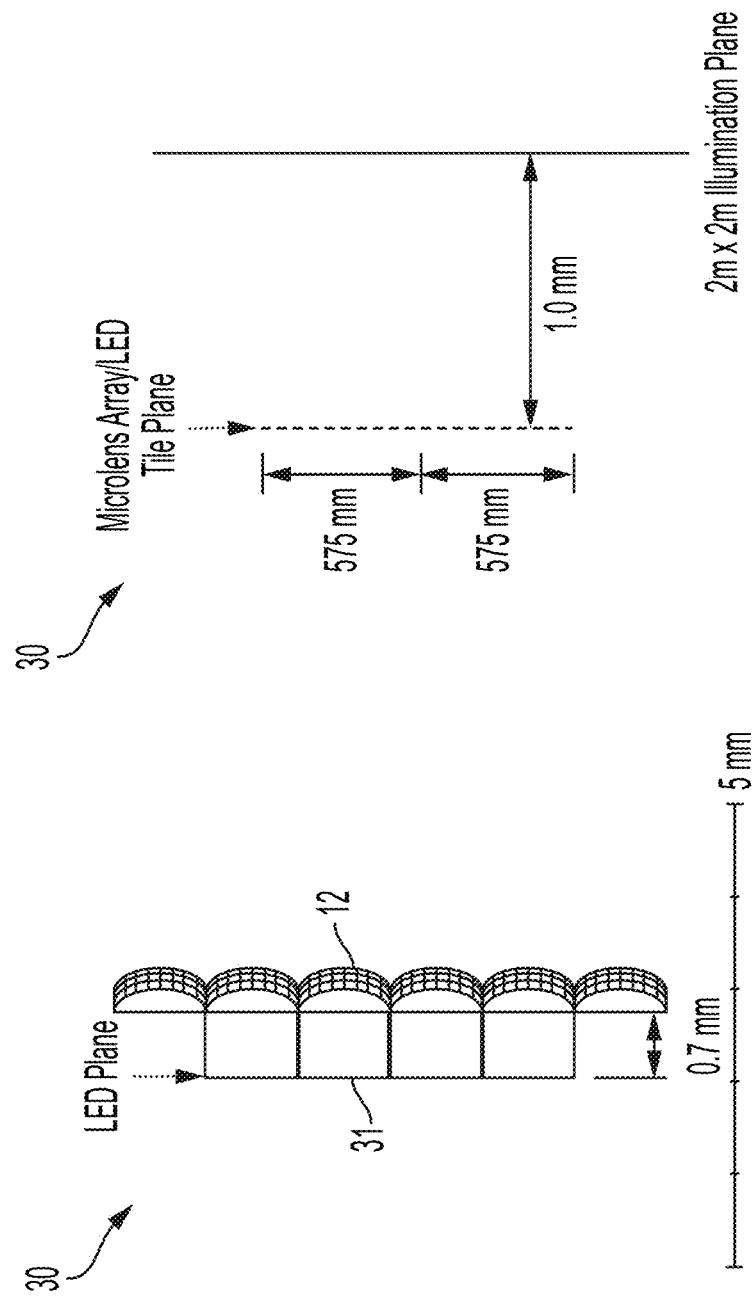

SYSTEM AND METHOD FOR LIGHT FIELD ILLUMINATOR SHEET-BASED DYNAMIC LIGHTING OUTPUT

FIELD

This application relates in general to lighting, and in particular, to a system and method light field illuminator sheet-based dynamic lighting output.

BACKGROUND

Electrical lighting is the most common form of artificial lighting in industrial societies and is essential for enabling activities after dark and in environments where natural light is not sufficient. As a result, electrical lighting is a significant source of electricity consumption, with one estimate placing commercial sector lighting electricity consumption at 12% of total commercial sector electricity consumption in 2020. Considering the amount of electrical energy consumed, efficiency, convenience, and cost of lighting systems becomes particular important, with lighting application efficiency being a new frontier for future lighting energy savings.

Unfortunately, current electrical lighting, and commercial electrical lighting in particular, is rather inefficient. For instance, commercial lighting is static and provides flood illumination, covering areas that may or may not need light, thus wasting electrical energy.

Current solutions for improving the light application efficiency (LAE) of lighting systems, particularly commercial lighting systems, have proved inadequate due to either inadequate efficiency, difficulty in directing the light at a desired direction and not to a location where no light is needed, not providing the spectral power distribution that is most advantageous for the human visual system, not delivering an efficacious light intensity for a particular environment, or their expense. For example, commercial lighting sources are generally solid state light (SSL) sources: light sources that utilize semiconductor light-emitting diodes (LEDs), polymer light-emitting diodes (PLED), or organic light-emitting diodes (OLED) lights as sources of illumination. However, traditional solid state light (SSL) sources have key disadvantages, such as being thick, heavy, requiring expensive insulation and drilling holes in ceilings for installation, not being customizable (such as being limited to strut layouts), having large thermal cooling requirements, and not being bendable, thus limiting the placement of such light systems.

Thin lighting sheets (thin, flexible sheets on which LEDs or OLEDs are mounted) overcome the disadvantages of some of the traditional SSL sources relating to the difficulty of their placement and servicing. However, existing thin light sheets are not dynamic, being able to provide only the same amount of light in the same direction unless they are repositioned, and have other shortcomings. For example, in the case of organic light-emitting diodes (OLED) being used in thin light sheets, such light sheets tend to be expensive, have low efficiency, low reliability, do not allow for sensor (or other electronic device) integration, and do not allow for creation of affordable custom shapes. Similarly, thin sheets distributed by NthDegree Technologies Worldwide, Inc. of Tempe, Arizona, United States do not allow for full utilization of the LED lights in the sheets and tend to produce aesthetically unpleasing speckles or bright glare spots.

Likewise, Edge-Lit™ light pipes distributed by Fusion® Optics attempt to address the low efficiency of lighting systems. However, such pipes are thick, allow for limited spatial control, and do not allow integration of sensors or other electronic devices.

Finally, Glint Photonics, Inc. of Burlingame, Calif., United States, distributes Hero™ luminaires, the direction of whose light can be adjusted with a joystick while the luminaire remains in a fixed position and orientation. However, such luminaires have a high glare, and require moving mechanical parts to point the light in different directions. Dynamic light projection sources distributed by Lumileds Holding B.V. of Schipol, Netherlands suffer from a similar drawback of having a high glare.

Therefore, there is a need for a high efficiency lighting system that is low glare, flexible, delivers light to where the light is needed, has a suitable spectral distribution, provides effective intensity levels, and is easily customizable.

SUMMARY

A digitally-controlled LED illuminator sheet is provided that produces far-field illumination patterns or light field distributions and that improves light utilization. A dynamic directional solid-state lighting sheet that utilizes LEDs (or other kinds of solid-state light sources) positioned under each lenslet of a microlens array. Individual LED beam pointing direction depends on off-axis position relative to optical axis of lenslet. Individual beams from independent LEDs form illumination pixels at the illumination plane or within a volume space and can be modulated in intensity. Illumination pixels partially overlap in far-field illumination plane and illumination volume. Over a large illumination space many illumination pixels will partially superimposed on neighboring illumination pixels, with the overlap being in increments much smaller than the size of an illumination pixel. The LEDs can be digitally turned on or off and/or pulse width or amplitude modulated to produce digitally controlled far-field illumination patterns or light field distributions. The LEDs and lenslets are so closely spaced together that, at normal viewing distance, they appear like a diffuse continuous pattern instead of a pattern of individual bright spots. This property is responsible for the reduced glare. The LEDs can also have different spectral characteristics relative to one another, which would enable tailoring of the spectral power distribution of the illumination digitally by turning on certain LEDs at various levels of intensity.

In one embodiment, a light-emitting diode illuminator sheet assembly is provided. The sheet includes a microlens array that includes a plurality of lenslets; an array of light-emitting diodes (LEDs) aligned with each of the lenslets, wherein at least some of the LEDs in each of the arrays are positioned relative to the optical axis of the lenslet with which that array is aligned and at a position different from the position relative to the optical axis at which at least one of the remaining LEDs in that array is positioned relative to the optical axis of its lenslet; a computer in control of each of the LED lights, the computer including at least one processor, the computer configured to: obtain at least one of a desired far-field illumination pattern and a desired light field distribution; identify based on the angles associated with the LED lights those of the LED lights that need to be turned on to generate the at least one of the desired far-field illumination pattern and the desired light field distribution; and control the identified LED lights to generate the at least one of the desired far-field illumination pattern and the desired light field distribution.

In a further embodiment, a method for light-emitting diode illuminator sheet assembly control is provided. Data regarding a light-emitting sheet assembly is obtained, the light emitting sheet assembly including a microlens array including a plurality of lenslets, the light emitting sheet assembly further including an array of light-emitting diodes (LEDs) aligned with each of the lenslets, wherein at least some of the LEDs in one or more of the arrays are positioned off-axis relative to the optical axis of the lenslet with which that array is aligned and at a position different from a position relative to the optical axis at which at least one of the remaining LEDs in that array is positioned. At least one of a desired far-field illumination pattern and a desired light field distribution are obtained. Based on the angles associated with the LED lights those of the LED lights that need to be turned on to generate the at least one of the desired far-field illumination pattern and the desired light field distribution are identified. The identified LED lights are controlled to generate the at least one of the desired far-field illumination pattern and the desired light field distribution.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

FIG. 6A is an illustration of a ray trace created by a small section of the sheet when all LEDS in that section of the sheet are on.

FIG. 6B is an illustration of a ray trace created by a small section of the sheet when only on-axis LEDs are on.

FIGS. 6C and 6D are illustrations of ray traces created by a small section of the sheet when only off-axis LEDs in that section are on.

FIG. 6I is an illustration of a ray trace with a presence of a low-level artifact created by a small section of the sheet.

FIGS. 15A-15B are diagrams describing details of the particular light sheet tiles used for an illumination simulation.

DETAILED DESCRIPTION

Figure 1:
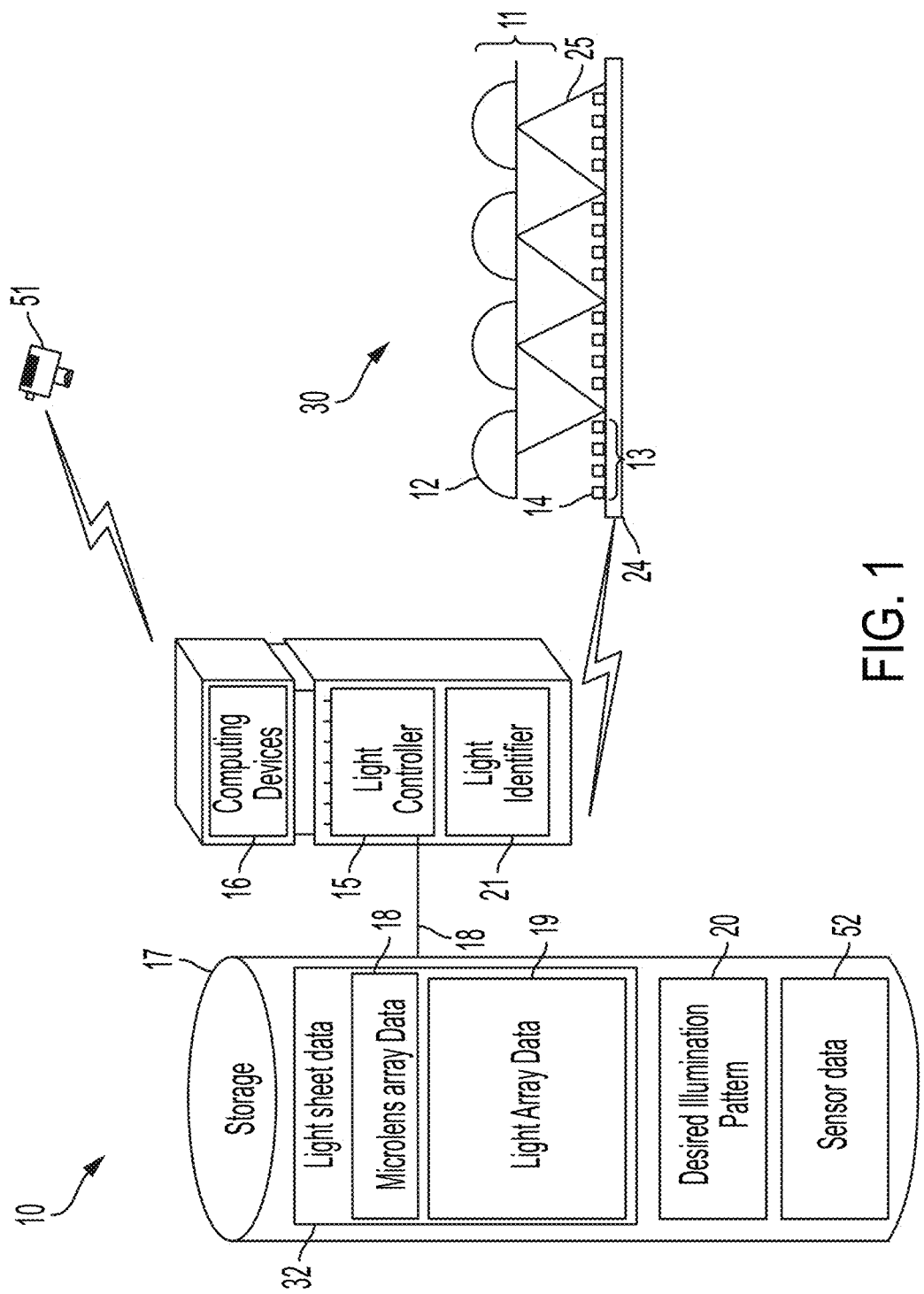
FIG. 1 is a diagram showing a system 10 for light field illuminator sheet-based dynamic lighting output in accordance with one embodiment.

Improved control over light distribution can be achieved through a combination of microlens arrays and computer-controlled LED arrays. FIG. 1 is a diagram showing a system 10 for light field illuminator sheet-based dynamic lighting output in accordance with one embodiment. The system 10 includes a light field illuminator sheet 30 (also referred to as a light sheet 30 and light sheet illumination tile 30 below), which in turn includes a microlens array 11, which includes a plurality of microlenses 12 (also referred to as lenslets 12 below). The microlens array 11 can include different types of lenslets 12 or combinations of different types of lenslets 12, with lenslets 12 being refractive elements, Fresnel elements, off-axis elements, holographic optical elements, diffractive optical elements, and reflective optical elements, though still other types of lenslets 12 are possible.

Aligned with each of the lenslets 12 is an array 13 of solid-state lights 14, each of the solid-state lighting arrays 13 being positioned under one of the lenslets 13 relative to the orientation shown with reference to FIG. 1. While in the description below, the array of solid-state lights 13 are referred to as an LED array 13, in a further embodiment, solid-state lights 13 other than LEDs could be used for in the array 13, such as PLEDs or OLEDs are possible. In a still further embodiment, different kinds of solid-state lights 14 could be combined in the same array 13. In a still further embodiment, arrays 13 with different kinds of solid-state lights 14 could be aligned with different ones of the lenslets 12 in the microlens array 11. In one embodiment, the lenslets 12 can be near-hemispherical, though other shapes of the lenslets are also possible. For example, the lenslets 12 can be spherical, aspherical, cylindrical, acylindrical, toroidal, aspheric toroidal, or free-form surface shapes, though still other shapes of the lenslets 12 are possible. The lights 14 can have different spectral characteristics relative to one another. Such differences in spectral characteristics can include differences in spectral radiation bandwidth, spectral peak wavelength, and spectral power distribution, though other spectral characteristics in which differences exist are also possible. In one embodiment, the lights 14 in the same array 13 can have the same spectral characteristics, and differences only exist between spectral characteristics of lights 14 that are in different arrays. In a further embodiment, lights 14 in the same array 13 can also have differences in their spectral characteristics. In a still further embodiment, while differences in spectral characteristics exist between lights 14 in the same array 13, each array 13 could have lights 14 with the same spectral characteristics as in other arrays 13. The differences in spectral characteristics between the lights 14 enables tailoring of the spectral power distribution of the illumination created by the system 10 digitally by turning on certain lights at various levels of intensity, which in turn can increase the lighting application efficiency.

Figure 2A:
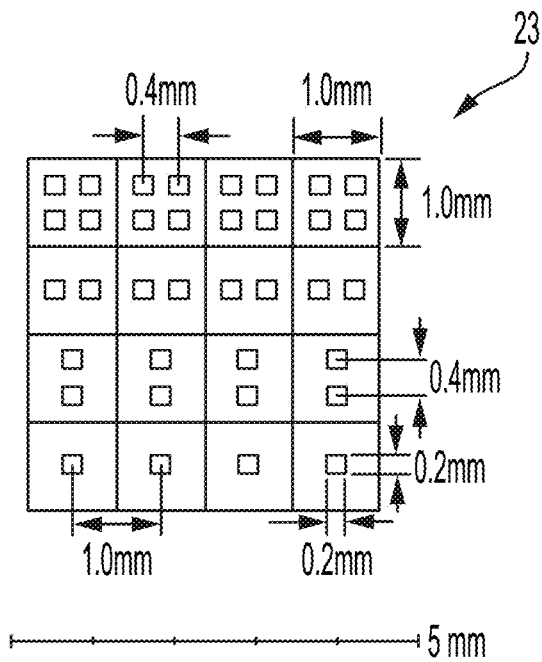
FIGS. 2A-2B is a diagram illustrating two groups of arrays in accordance with two embodiments.
Figure 2B:
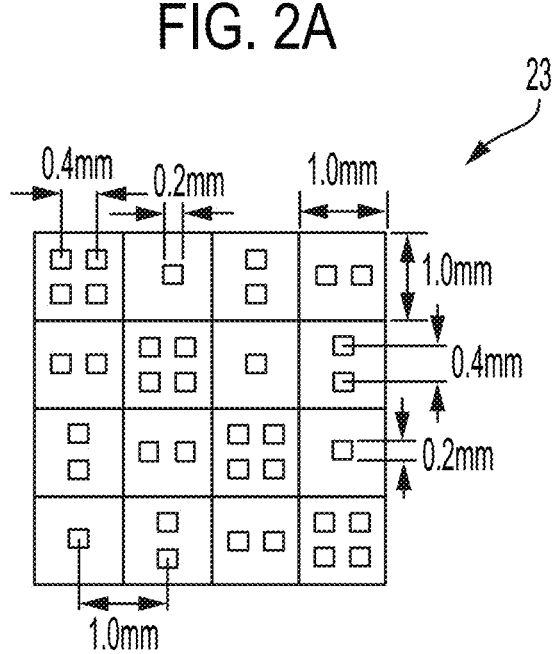

LEDs 14 can be arranged under microlens array 11 and individually digitally turned on or off to produce digitally controlled far-field illumination patterns. FIGS. 2A-2B is a diagram illustrating two groups 23 of arrays 13 in accordance with two embodiments. Each of the groups 23 is positioned to be aligned with a single microlens array 11. While in FIGS. 2A-2B, both the groups 23 and individual arrays 11 are shaped as squares, other shapes are possible. While the number of lights 14 in each array 13 as seen with reference to FIGS. 2A-2B varies from 1 to 4, other numbers of lights 14 in each array 13 are possible. Using a single light 14 in array allows to cover a specific angle at which light needs to be provided. Due to thermal management and other considerations, the lights 14 may not be able to be placed contiguously butted in contact next to one another. Depending on the LED layout pattern, one LED may be needed to cover a specific angle not covered by other LEDs in the arrays 13 under other lenslets 12. Further, while FIGS. 2A-2B show particular dimensions of the groups 23 of arrays 13 and particular distances between lights 14 in the same array, other distances are dimensions are also possible.

The LED array 13 and the microlens array 12 make up part of a light field illuminator sheet 30. The LEDs 14 in each array 13 are positioned so that their beams point at different directions (angles) at the lenslet 12 with which that array 13 is aligned. The direction of each beam from each of the lights 14 in each array ultimately depends on the off-axis position of the light 14 relative to the optical axis of the lenslet 12 with which that array 13 is aligned. The direction of the light from the LEDs 14 is always normal to the LED 14 emitting surface. The position of the LEDs 14 relative to the optical axis of the lenslet 12 and the focal length of the lenslet 12 that the LED 14 is under determine the direction of the light from LED 14 refracted by lenslet 12. The larger the off-axis position of a light 14 with respect to the lenslet 12 (with a light 14 being off-axis to the lenslet 12 if the optical axis of the light 14 is not coincident with a mechanical center of the lenslet 12), the larger the direction angle after the lenslet 12 is produced. By having different lights 14 at different positions, varying illumination patterns can be produced.

Each of the lights 14 in each of the arrays 13 are individually controlled by a Light Controller 15 executed by at least computing device 16 that is interfaced to the arrays 13. In one embodiment, the lights 14 are individually address via a central backplane, such as a matrix addressable backplane, though other arrangements are also possible. In one embodiment, the at least one computing device 16 could be connected to each of the lights 14 via a wired connection. In a further embodiment, each of the lights 14 could be interfaced to a wireless transceiver that receives commands from the at least one computing device 16 wirelessly (either directly from a wireless transceiver interfaced to the server 16 or via an Internetwork, such as the Internet or a cellular network).

In a still further embodiment, the interfacing of the computing device 16 to each of the lights 14 could be accomplished via a combination of a wired and wireless connection. In addition, each of the lights 14 can receive power, either through the backplane (with a wired connection providing power from a power source, such as an alternating current power source (such as an electric socket) or a direct current power source (such as a battery included with the light sheet 30), though other ways of powering the light sheet 30 are possible. In one embodiment, the wires that provide power to the light sheet 30 can run proximately to the wires via which the commands from the at least one computing device 16 are received, and in one embodiment, power could be provided through the computing device 16 (with the computing device in turn interfacing to a power source such as an electric socket), though other connections are possible.

While the at least computing device 16 is shown as a server with reference to FIG. 1, in a further embodiment, other types of computing devices 16 can be used, such as laptop computers, desktop computers, mobile phones, and tablets, though still other types of computing devices are possible.

The Light Controller 15 controls when each light 14 is turned on and off as well as the pulse width (with pulse width being the time that the light 14 is on) and amplitude emitted by each light 14, thus controlling the intensity of the light produced by each LED 14. The individual beams from each LEDs form illumination pixels at the illumination plane or within a volume space, and their intensity can be modulated by the Light Controller 15 by controlling the light 14 producing the respective beam. Further, many illumination pixels will partially be superimposed on the neighboring illumination pixels over a large illumination space. The increments of the overlap are significantly smaller than the size of the illumination and by controlling which lights 14 are turned on at a particular time, the Light Controller 15 can control where such overlaps occur, which in turn allows to improve the overall quality of the illumination pattern produced (similarly to how high addressability printing with lower resolution spots can be used to improve image quality by removing jagged edges and achieving clustered light distribution for better half-toning). Further, by controlling which LEDs 14 are turned on and the parameters of their use, the Light Controller 14 can achieve better light utilization that improves lighting application efficiency.

The computing device 16 is interfaced to a storage 17, which can be internal to the computing device 16 (such as internal memory of a laptop computer) or external to the computing device 16. The storage 17 stores data 32 describing the characteristic of the light sheet 30, including data 18 describing the parameters of the microlens array 11, such as the data describing the number of lenslets 12 in each of the microlens arrays 11, the size and shape of each lenslet 12, and the type of each lenslet 12 in the array 11, though other types of data 18 are also possible. The light sheet data 32 further includes data 19 describing the light array 13 aligned with each of the lenslets 13, including the type of lights 14 in each of the array, the number of the lights 14 in each array 13, the positioning of each of the lights 14 relative to the lenslet 12 aligned with the array 13 (such as the off-axis position of that light 14 relative to the lenslet 12), though still other types of data 19 are possible. If other components are present in the light sheet 30, such as a spacer 25, a back reflector 24, and a light diffuser 26, characteristics of such additional components are included as part of the light sheet data 32.

Figure 6A:
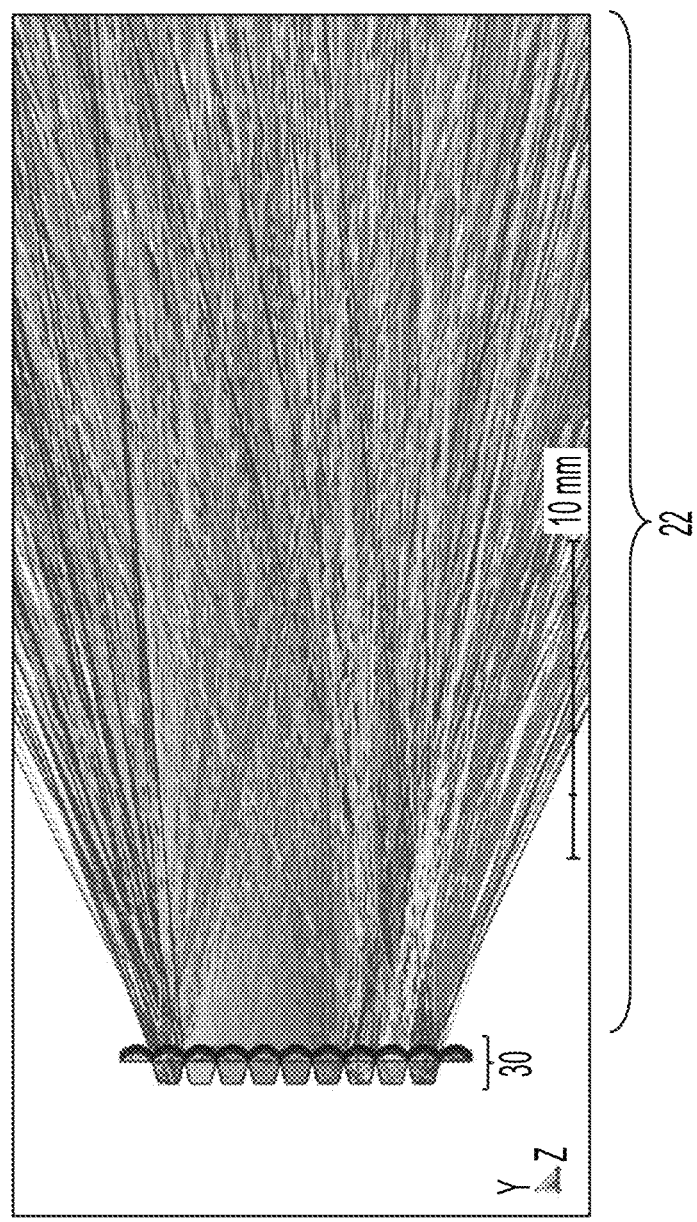
Figure 6B:
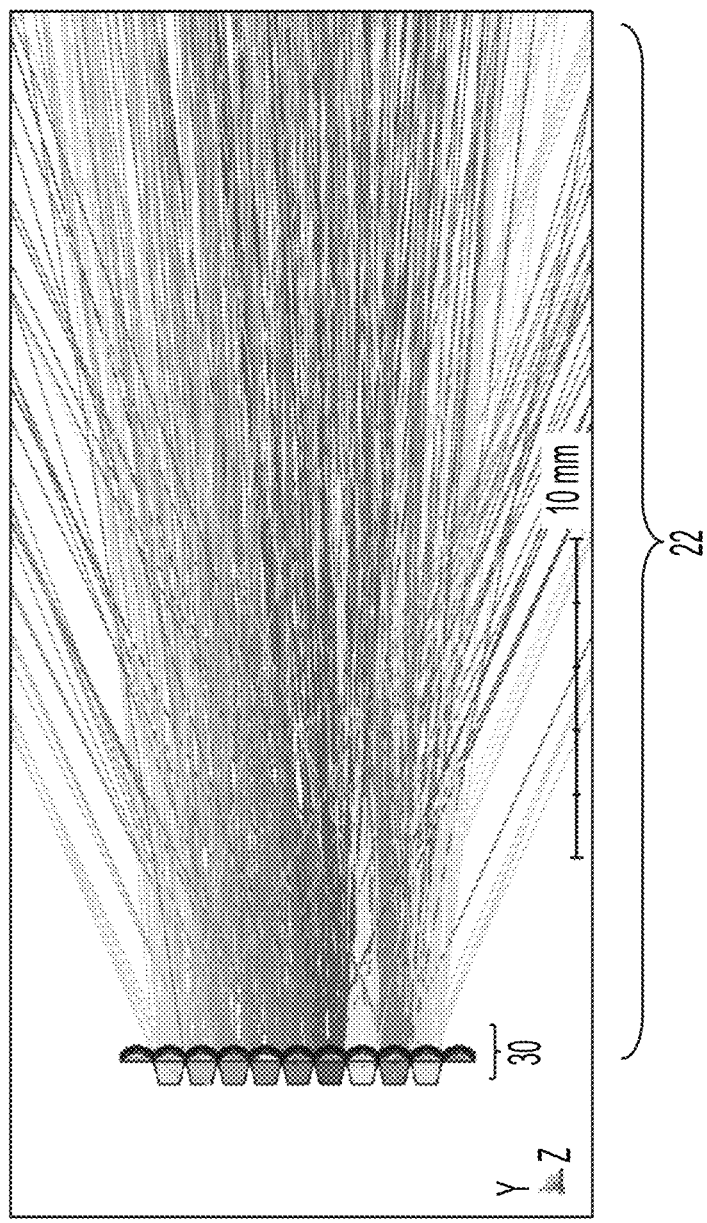
Figure 6D:
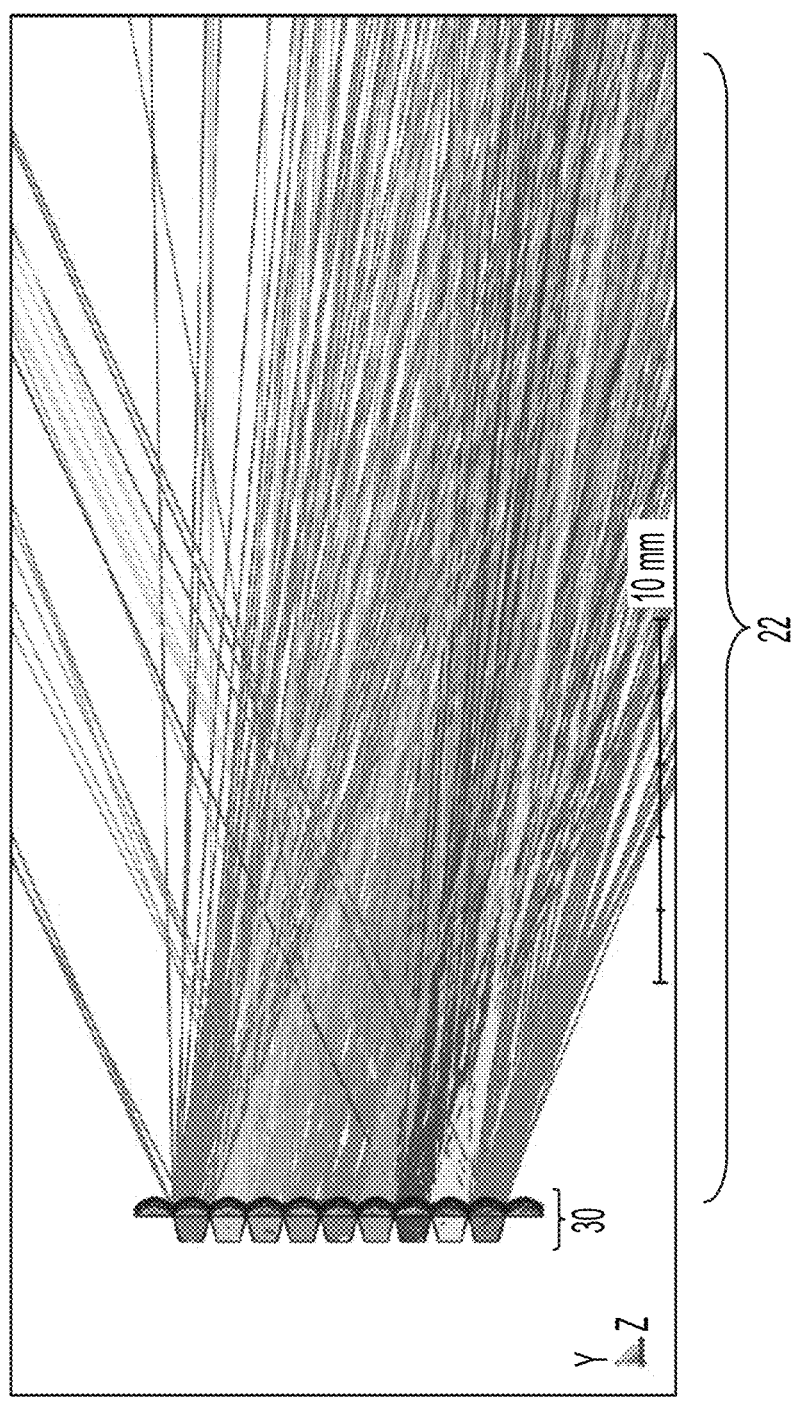
Figure 6E:
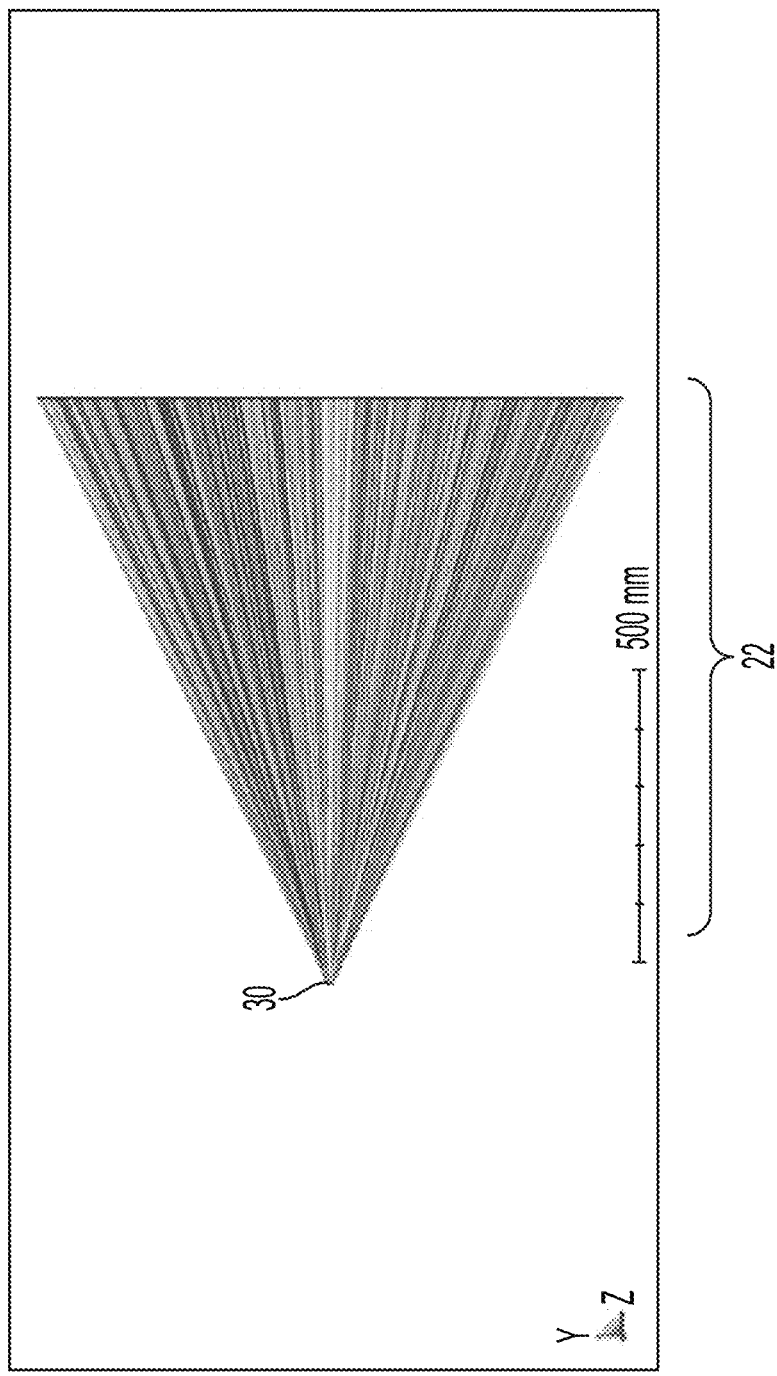
FIGS. 6E and 6F are illustrations of ray traces created by a small section of the sheet when all LEDs are on in Far-Field.
Figure 6F:
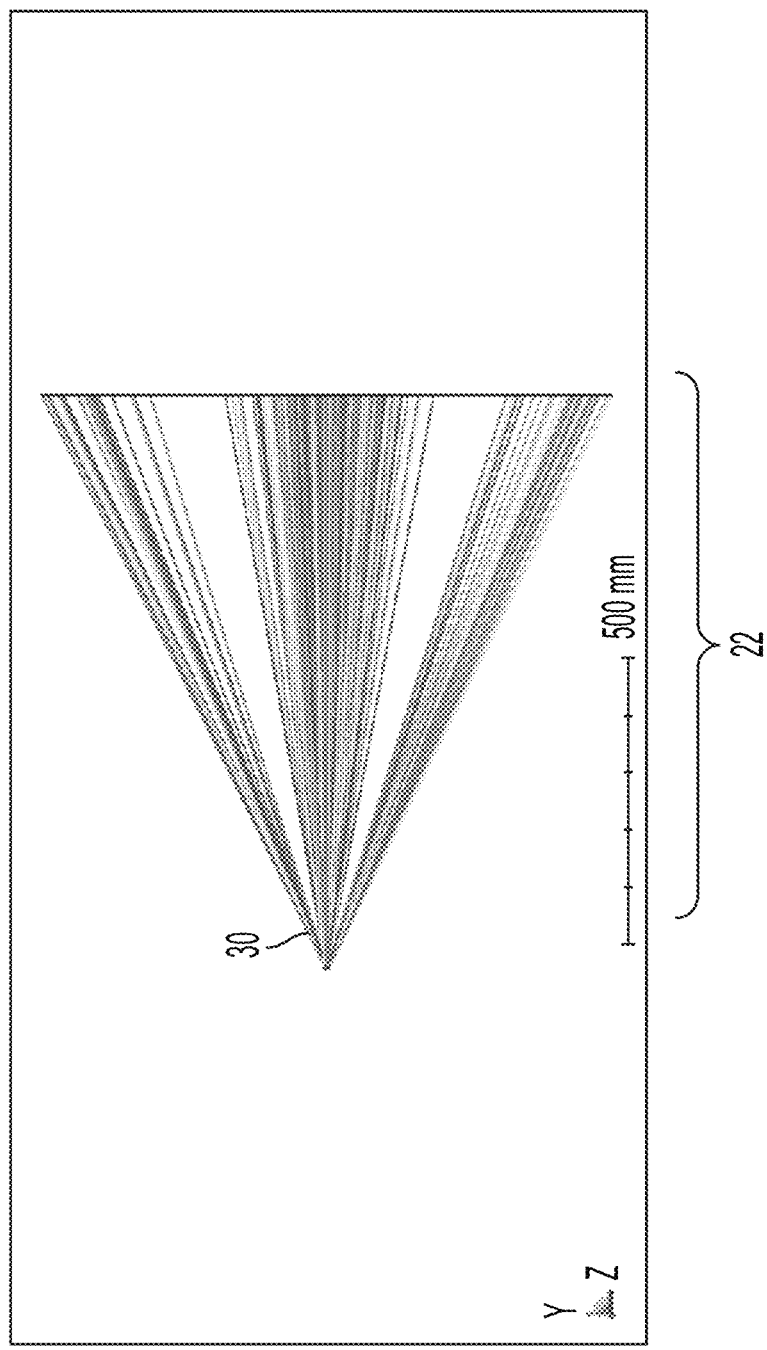
Figure 6H:
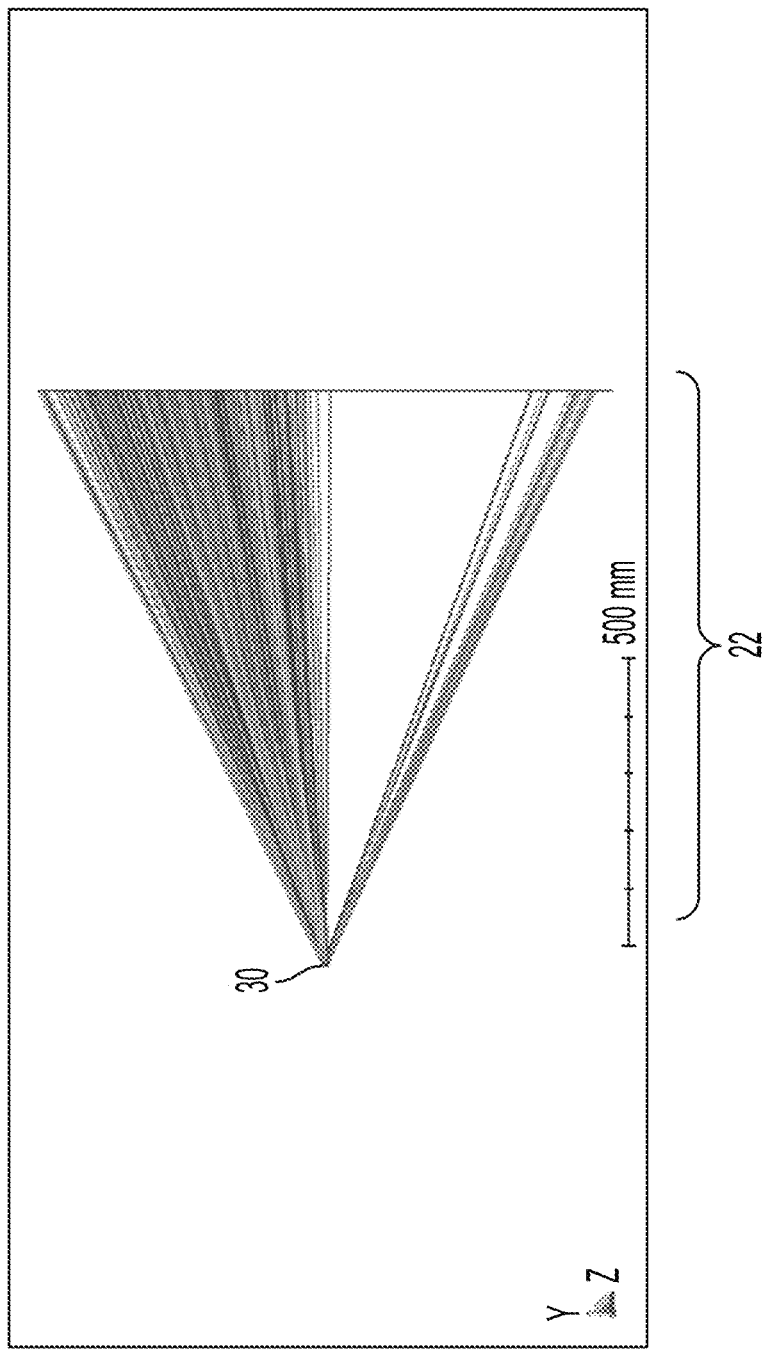
FIG. 6H is an illustration of ray traces created by a small section of the sheet by off-axis LEDs in that section in the Far-Field region.
Figure 61:
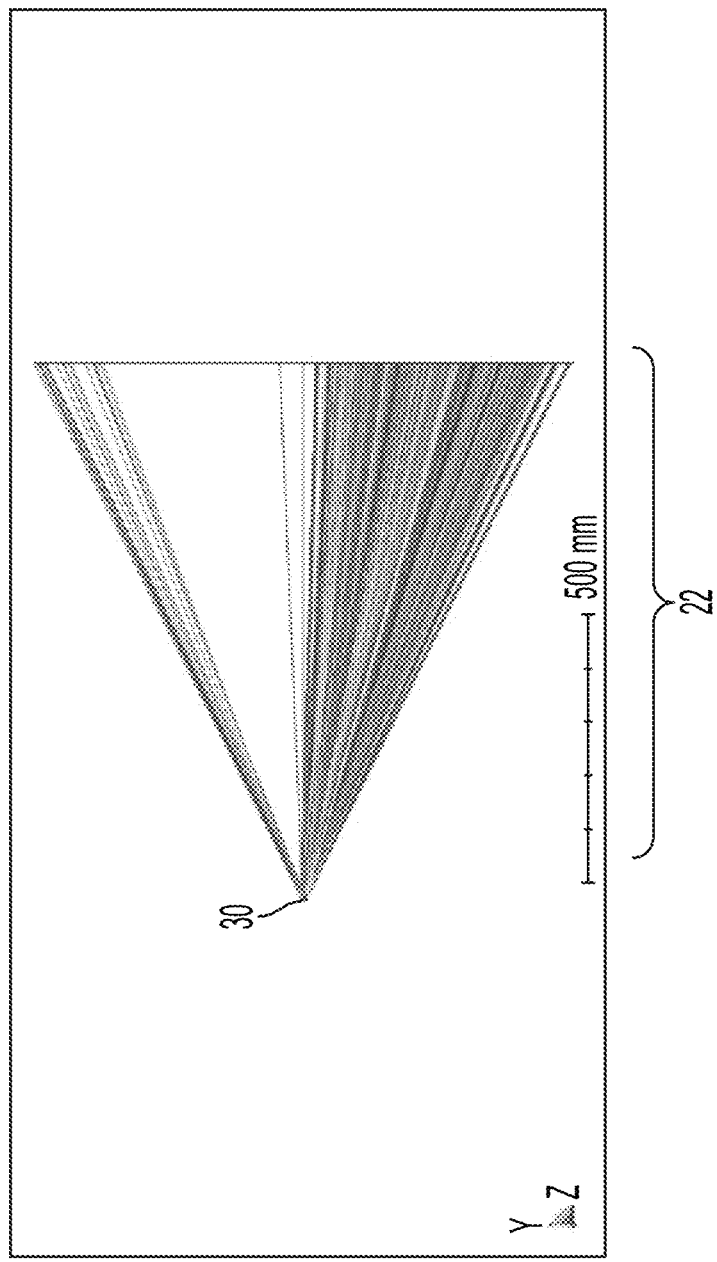

The computing device 16 further executes a Light Identifier 21, which obtains (such as by receiving from a user) and storing in the storage 17 data 20 regarding a desired light illumination pattern, which can be a far-field illumination pattern or a light field distribution (though other types of illumination patterns are also possible). The desired illumination pattern data 20 can describe where amount and intensity of light to be shone by the sheet at particular places in the illumination space, as well as where illumination pixels should overlap. The data 20 can describe the illumination pattern at a single time instance, a static illumination pattern over a time period, or a dynamic desired illumination pattern that changes over a time period. Still other information can be included in the desired illumination pattern. The Light Identifier 21 uses the desired light illumination pattern 22, the light sheet data 32 (including the angles at which the lights 14 are directed by their lenslets 14) to identify those of the lights 14 in the arrays that need to be turned on to create the desired illumination pattern. FIGS. 5A-5F show, for purposes of illustration, different illumination patterns 22 created through overlapping of illumination pixels. The heavier-weighted dashed line in the FIGS. 5A-5F represent the intensity or the irradiance level at the illumination plane. The illumination patterns can be far-field, as shown with reference to FIGS. 6A-6F. FIG. 6A is an illustration of a ray trace 22 created by a small section of the sheet 30 when all LEDS 14 in that section of the sheet are on. FIG. 6B is an illustration of a ray trace 22 created by a small section of the sheet 30 when only on-axis LEDs 14 in that section are on. FIGS. 6C and 6D are illustrations of ray traces 22 created by the sheet 30 when only off-axis LEDs 14 in that section are on, with the lights 14 in FIG. 6C pointing in a different direction from the direction of the lights 14 in FIG. 6D. FIGS. 6E and 6F are illustrations of ray traces 22 created by a small section of the sheet 30 when all LEDs 14 in that section are on in Far-Field. FIG. 6H is an illustration of ray traces 22 created by the sheet 30 by off-axis LEDs in the Far-Field region. FIGS. 6A-6F illustrate that there are multiple ways to illuminate the same object spatially, but the illumination angles may be different depending on what LEDs 14 in combination with which lenslet 12 are used. For example, if a vertical surface like a person's face needs to be illuminated, light at more vertical angles will create shadows where more horizontal angles will create less shadows and present a better view of the face.

Figure 3A:
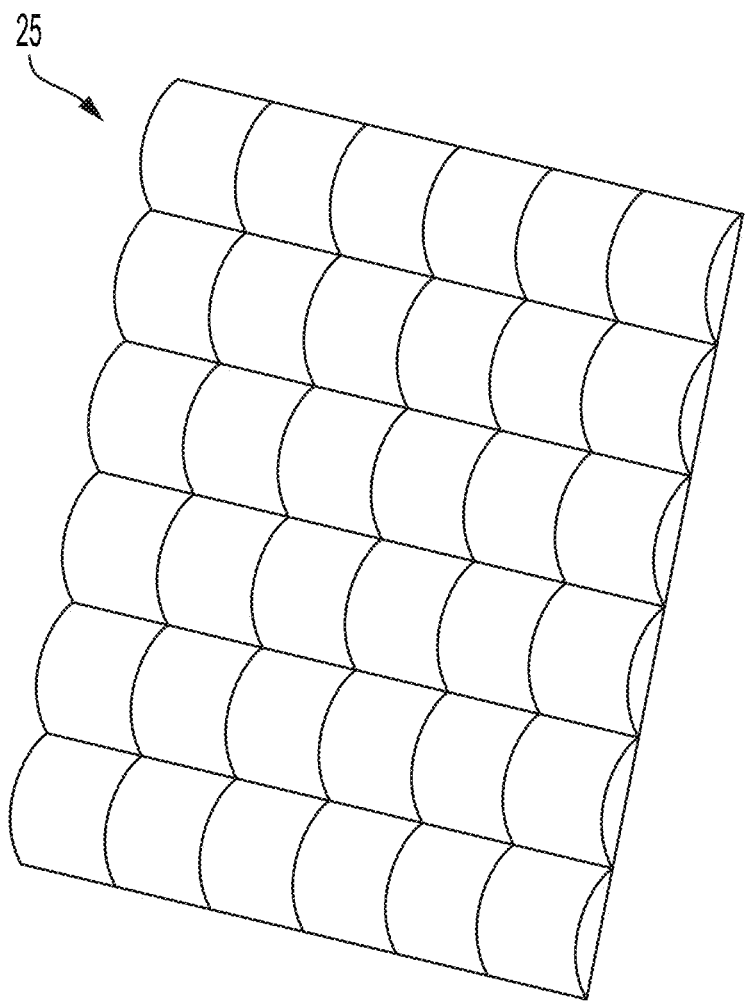
FIGS. 3A-3B are diagrams showing front (the side facing the lenslets) and back (the side facing the LEDs) of a pyramidal, reflective, honeycomb-shaped spacer 25 in accordance with one embodiment.
Figure 3B:
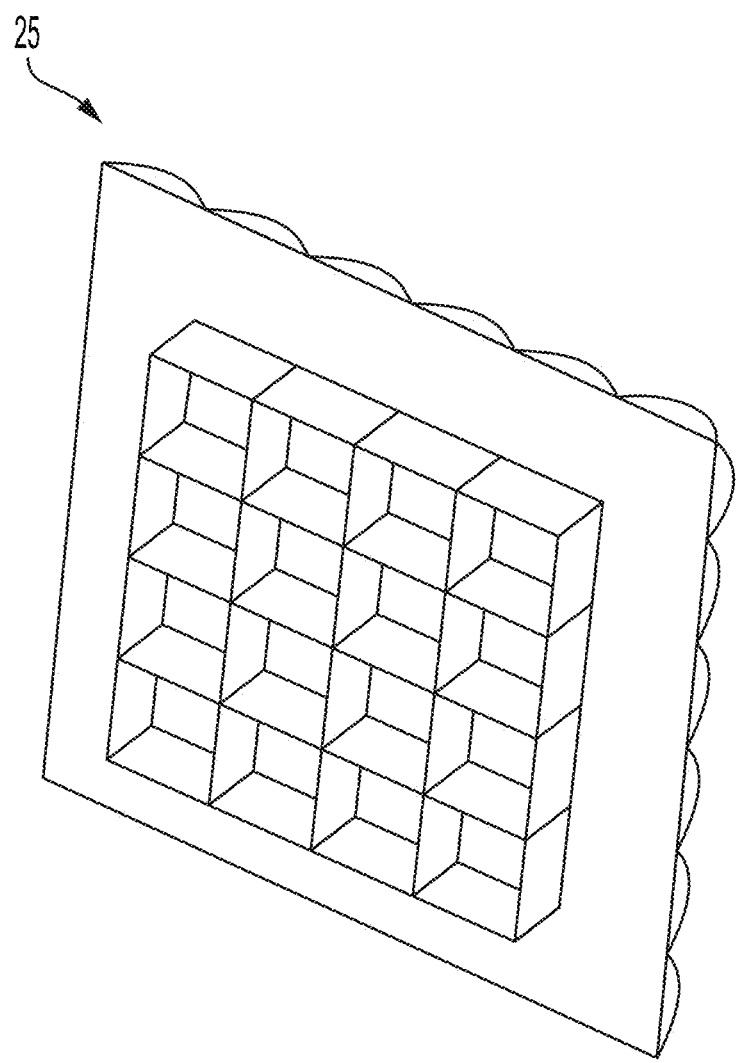
Figure 10:
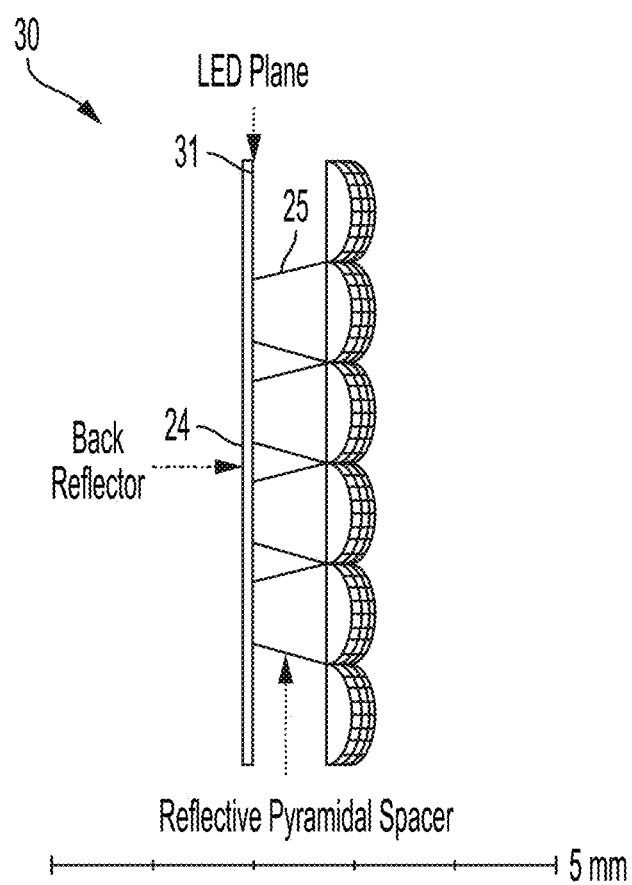
FIG. 10 shows an expanded view of a light sheet including the spacer and the back reflector and with LEDs being integrated into an LED plane in accordance with one embodiment.
Figure 11:
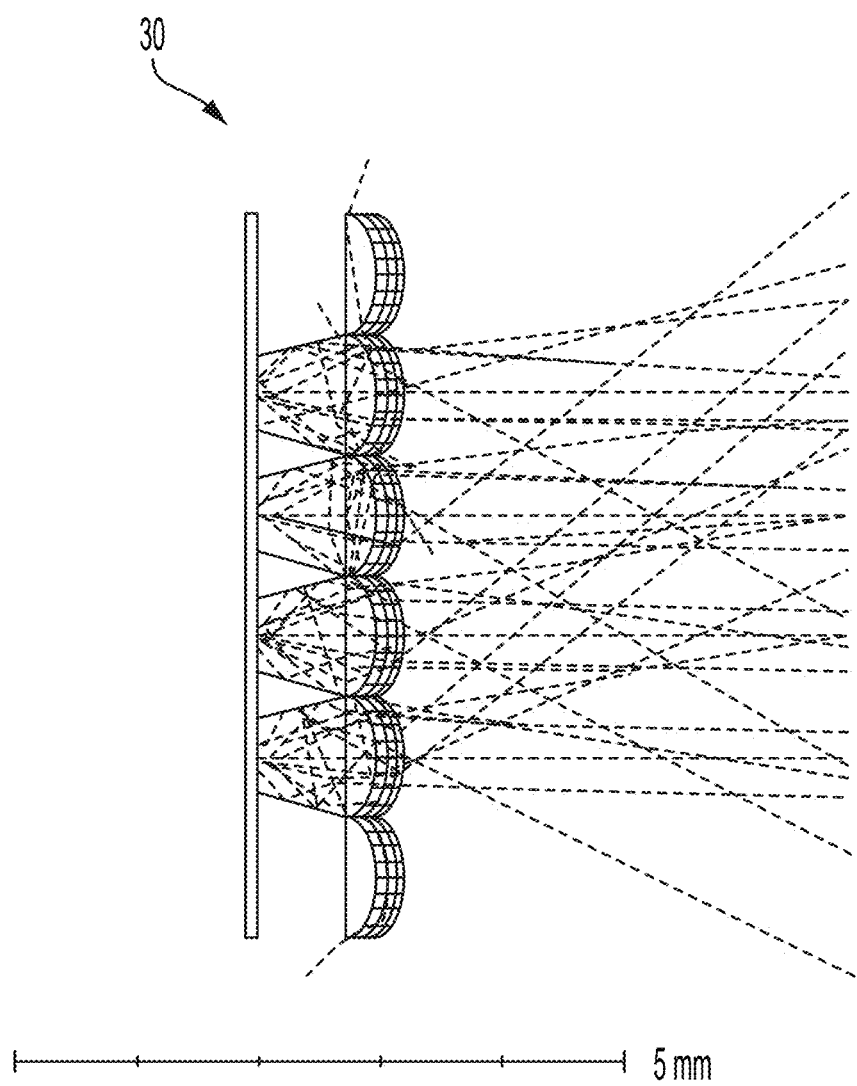
FIG. 11 shows the light sheet of FIG. 10 with the LEDs emitting light.
Figure 12A:
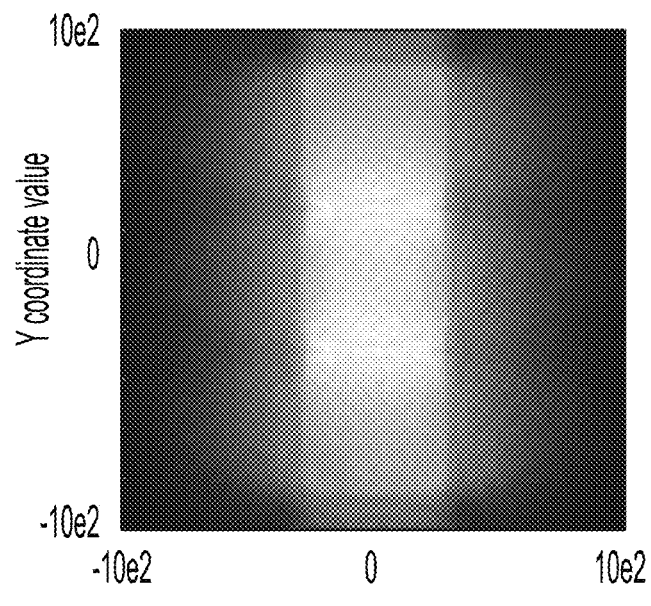
FIGS. 12A-B show simulated irradiance patterns achieved using three light sheet tiles that included the reflective pyramidal honeycomb-shaped spacer.
Figure 12B:
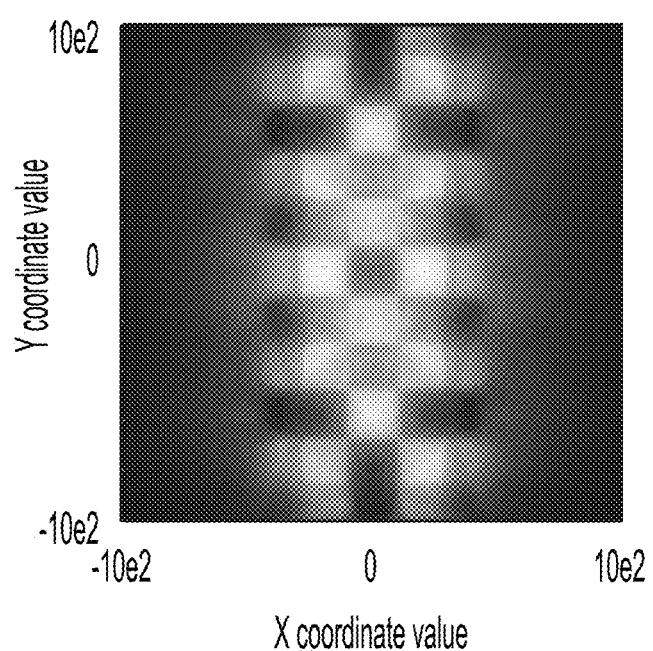
Figure 13A:
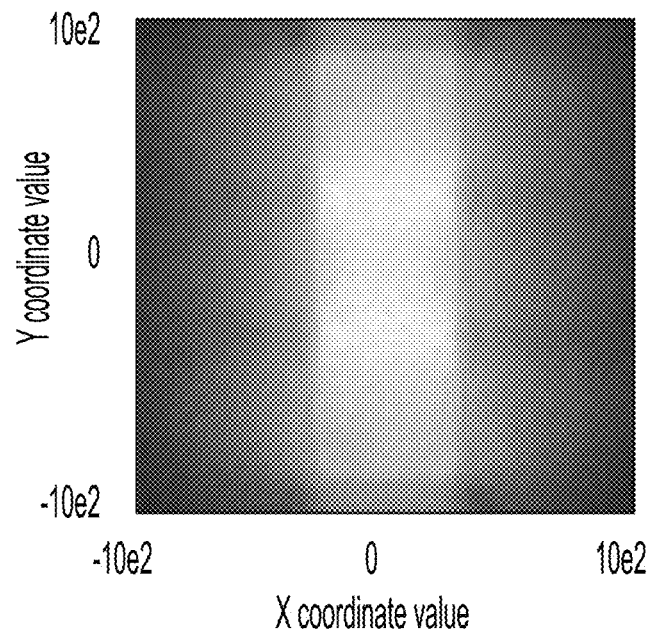
FIGS. 13A-B show simulated patterns, adjusted for human visual brightness perception, achieved using three light sheet tiles that included the reflective pyramidal honeycomb-shaped spacer and the back reflector.
Figure 13B:
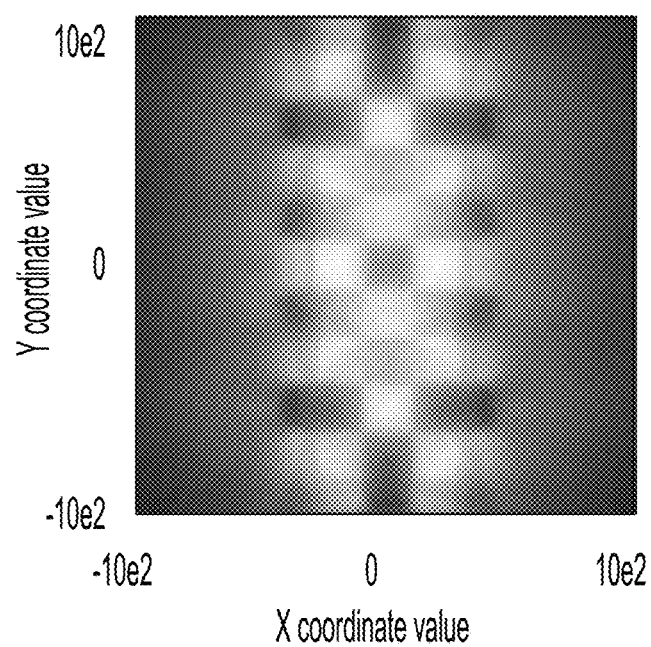

A significant portion of the light emitted by LEDs tends to be reflected back to the LEDs by the surrounding environment, thus decreasing the efficiency of the LEDs (as the reflected light cannot be used for the primary purpose of providing illumination) and heating up the LEDs. The sheet includes several components to increase the light extraction. One such component is the spacer 25 positioned between the microlens array 11 and the light arrays 13. In one embodiment, the spacer 25 can be a pyramidal, reflective, honeycomb-shaped spacer 25, as shown with reference to FIGS. 3A-3B, though other shapes of the spacer 25 are also possible. FIGS. 3A-3B are diagrams showing front (the side facing the lenslets 12) and back (the side facing the LEDs 14) of a pyramidal, reflective, honeycomb-shaped spacer 25 in accordance with one embodiment. Similarly, on the opposite side of the light arrays 13 to the side that faces the microlens array 11 is positioned a back reflector 24, which reflects the light emitted by the LEDs 14 towards the microlens array 11. In one embodiment, the spacer 25 and the back reflector 24 can be coated with aluminum or silver. In a further embodiment, the spacer 25 and the back reflector could be covered with a wide band reflective coating. Still other coatings are possible. While in one embodiment, the spacer 25 and the back reflector 24 could have the same coating, in a further embodiment, the spacer 25 and the back reflector 24 could have different coatings. FIG. 10 shows an expanded view of a light sheet 30 including the spacer 25 and the back reflector 24 and with LEDs 14 being integrated into an LED plane 31 in accordance with one embodiment. FIG. 11 shows the light sheet 30 of FIG. 10 with the LEDs 14 emitting light. FIGS. 12A-B show simulated irradiance patterns achieved using three light sheet 30 tiles that included the reflective pyramidal honeycomb-shaped spacer 25 and a back reflector 24. Full light sheets will consist of many light sheet tiles 30. FIG. 12A shows the patterns when all of the lights 14 in the sheet 30 are on while the checkerboard-like pattern seen with reference to FIG. 12B was produced with only a subset of the lights 14 being on. FIGS. 13A-B show simulated patterns, adjusted for human visual brightness perception, achieved using three light sheet tiles 30 that included the reflective pyramidal honeycomb-shaped spacer 25 and the back reflector 24. Whereas FIGS. 12A-B show the illumination as a function of intensity or irradiance in terms of physical quantities like the energy or power per unit area, FIGS. 13A-B simulate what the human eye would see due to human vision system perceiving brightness on a logarithmic scale. Similarly to FIGS. 12A-12B, FIG. 13A shows the patterns when all of the lights 14 in the sheet 30 are on while the checkerboard-like pattern seen with reference to FIG. 13B was produced with only a subset of the lights 14 being on. Note that the spacers 25 can be hollow or solid (i.e., filled) and can also have CPC (compound parabolic concentrator) or rectangular CPC shapes. They can be made reflective by using reflective coatings like aluminum, silver, dielectric multilayer wide-band coatings or, if the spacer is solid, utilize TIR (total internal reflection) depending upon the design.

By extracting more diffuse light, the addition of the spacer and the back reflector increase the optical efficiency of the sheet 30. The exact degree of the increase depends on the particulars of the spacer 25 and the back reflector 24 used. For example, when an absorbing honeycomb-shaped spacer 25 and absorbing back reflector are used, the optical efficiency of the sheet 30 has empirically been shown to increase by approximately 29%. Likewise, when a reflective honeycomb-shaped spacer 25 and reflective back reflector are used, the optical efficiency of the sheet 30 has empirically been shown to increase by approximately 52%. The overall optical efficiency achieved with an aluminum coating on the honeycomb spacer 25 and the back reflector 24 and wide band antireflective coating on the honeycomb spacer 25 is around 73.5%. If a perfect coating on the spacer 25 and the back reflector 24 (with a perfect reflective coating reflecting 100% of the light and a perfect anti-reflective coating transmitting 100% of the light), the optical efficiency would rise to 90%.

Figure 4:
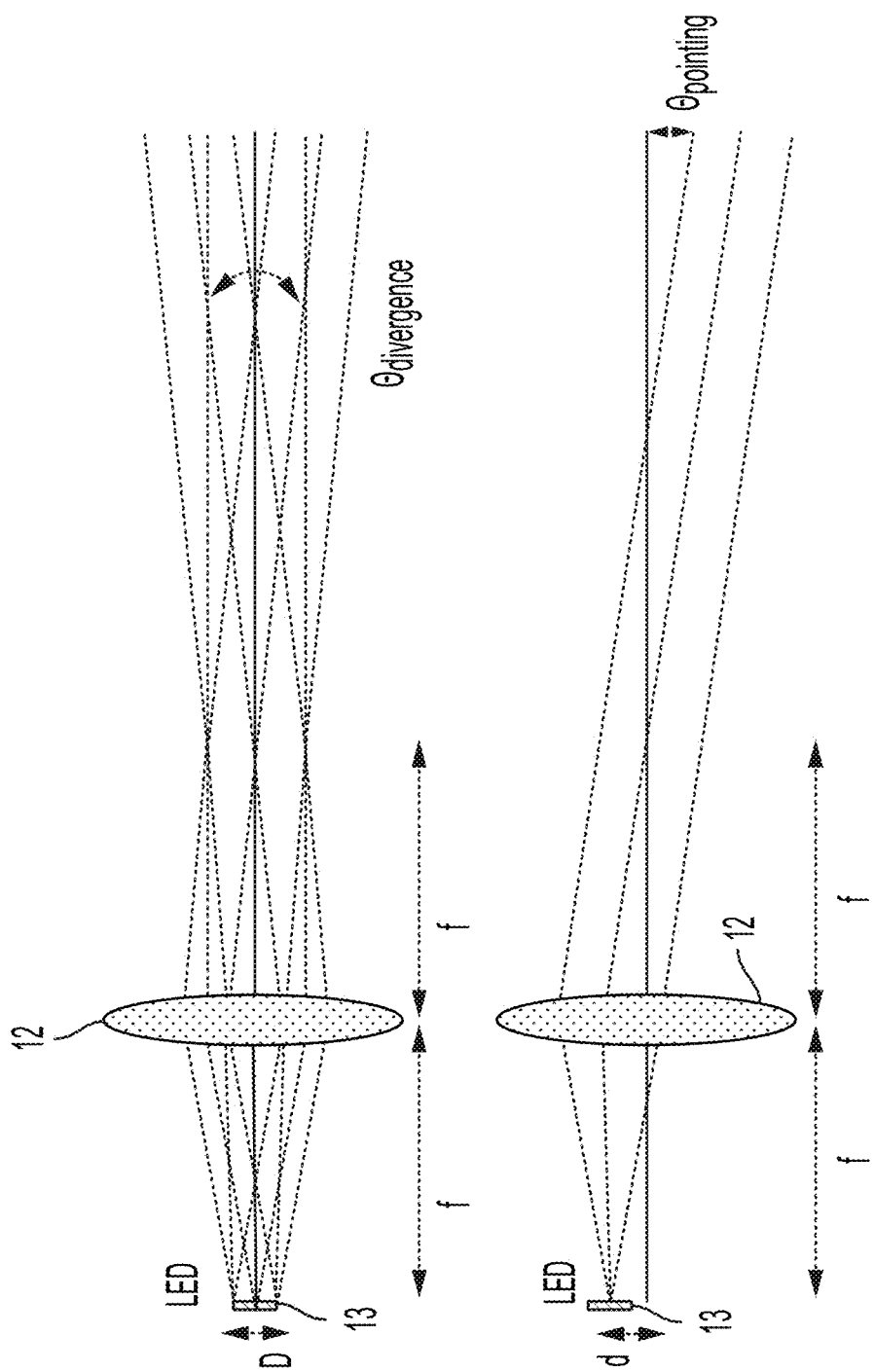
FIG. 4 is a diagram illustrating the pointing angle and the divergence angle.
Figure 5A:
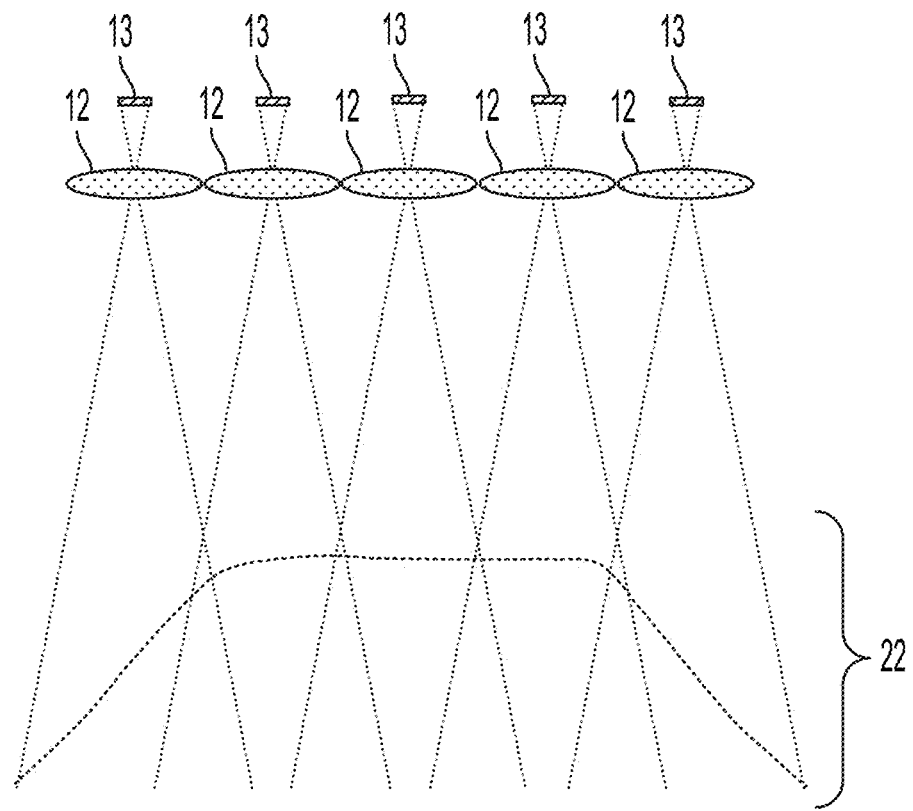
FIGS. 5A-5F show, for purposes of illustration, different illumination patterns created through overlapping of illumination pixels.
Figure 5B:
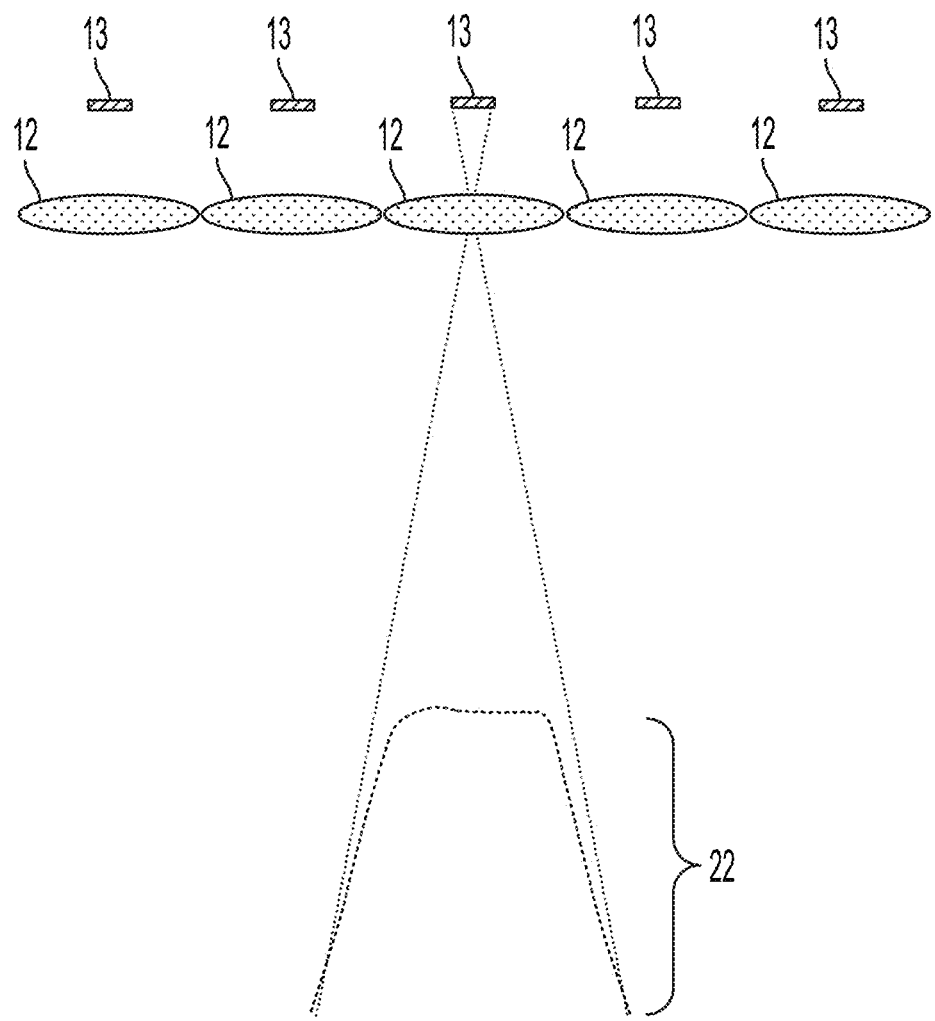
Figure 5C:
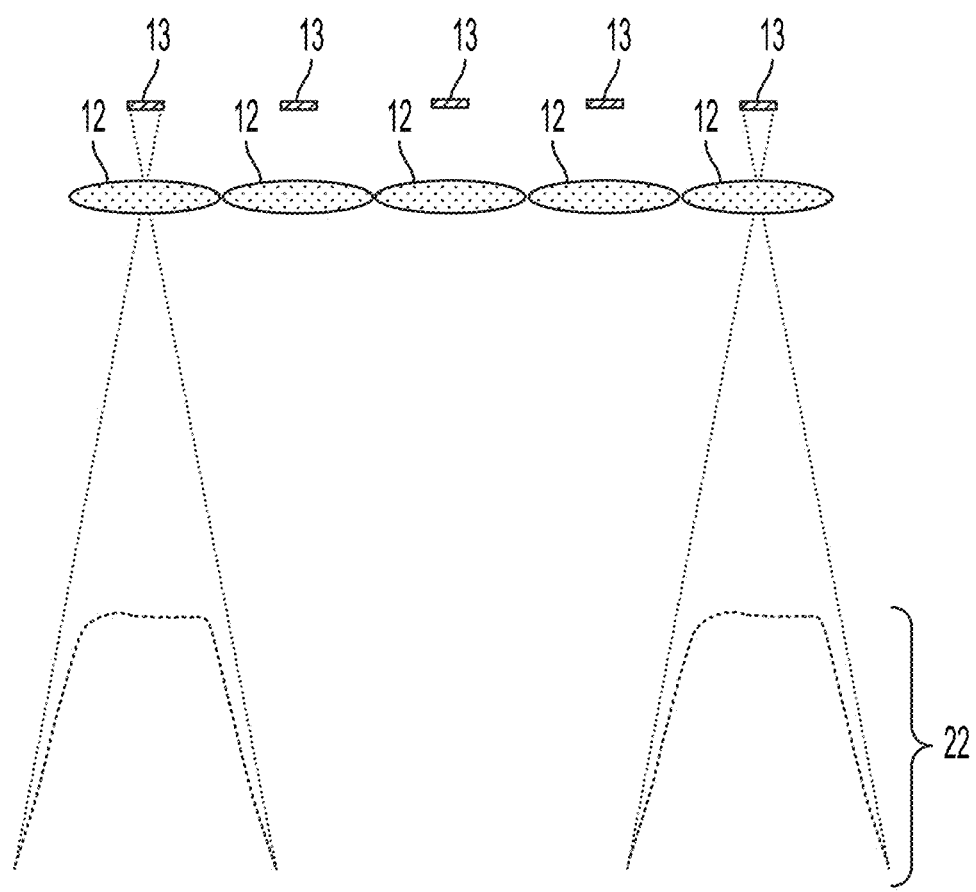
Figure 5D:
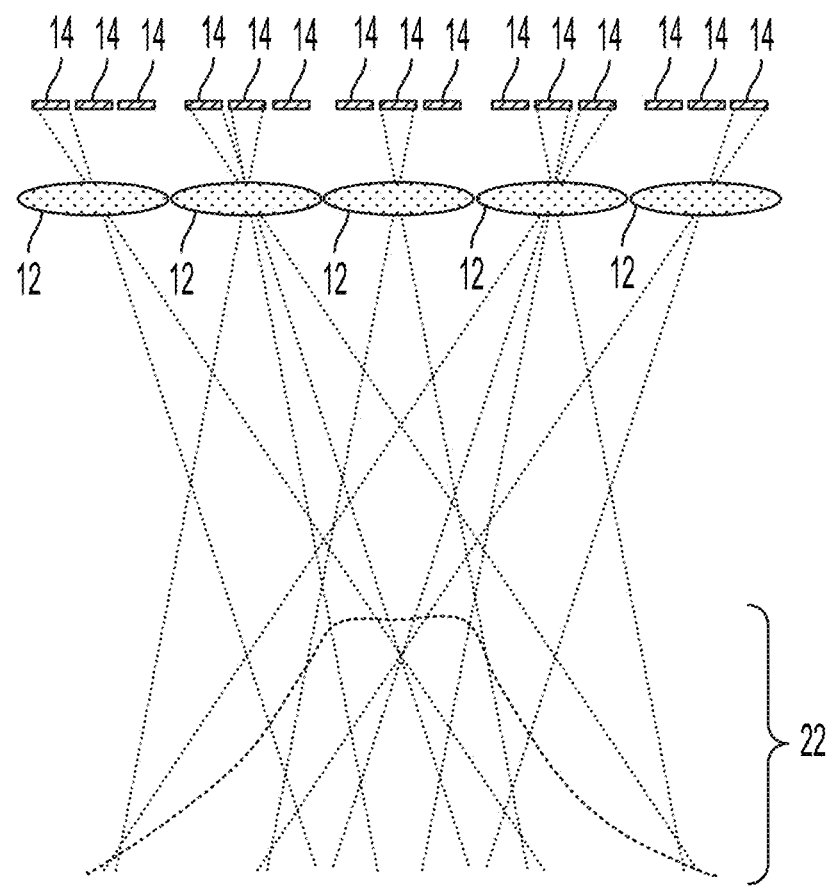
Figure 5E:
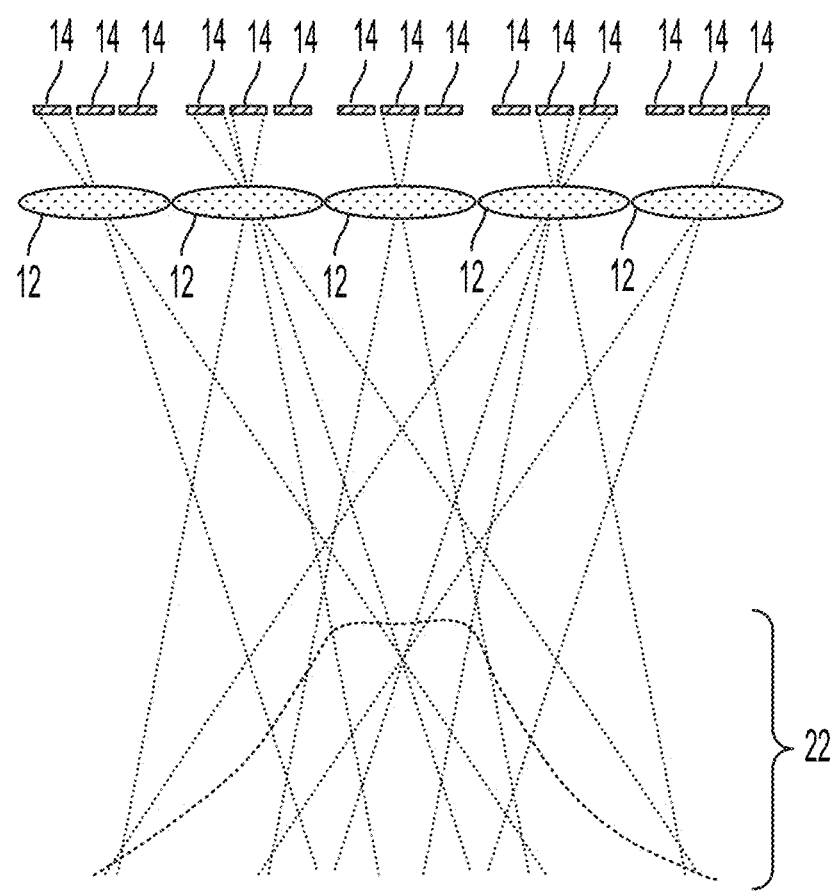
Figure 5F:
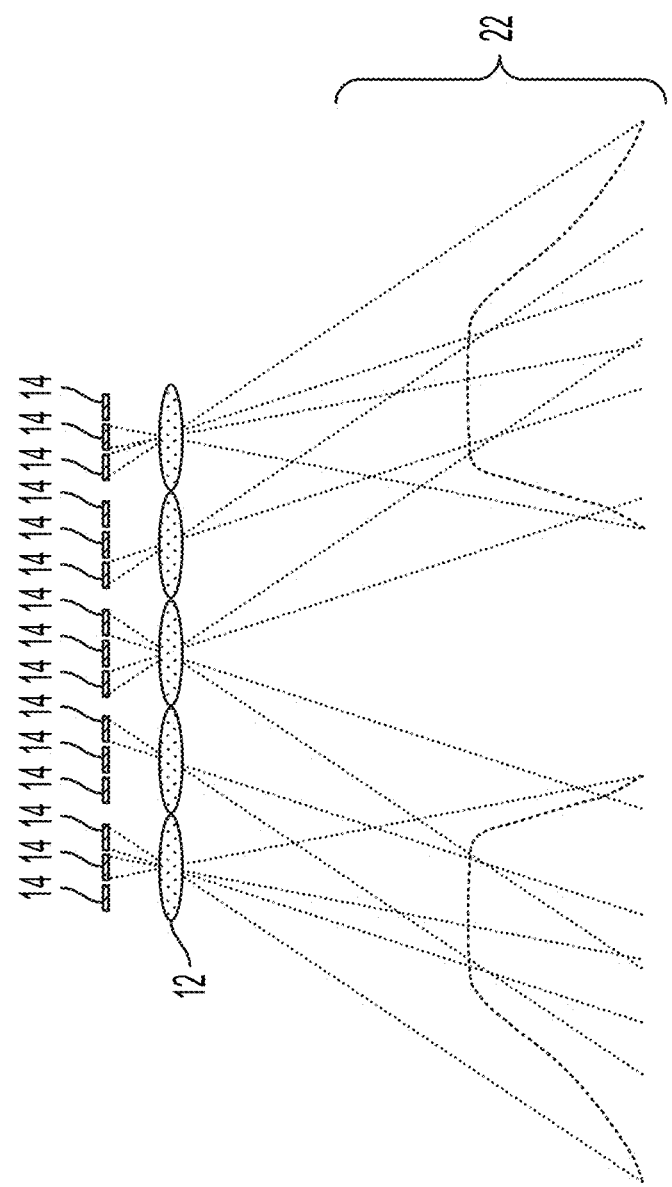
Figure 18:
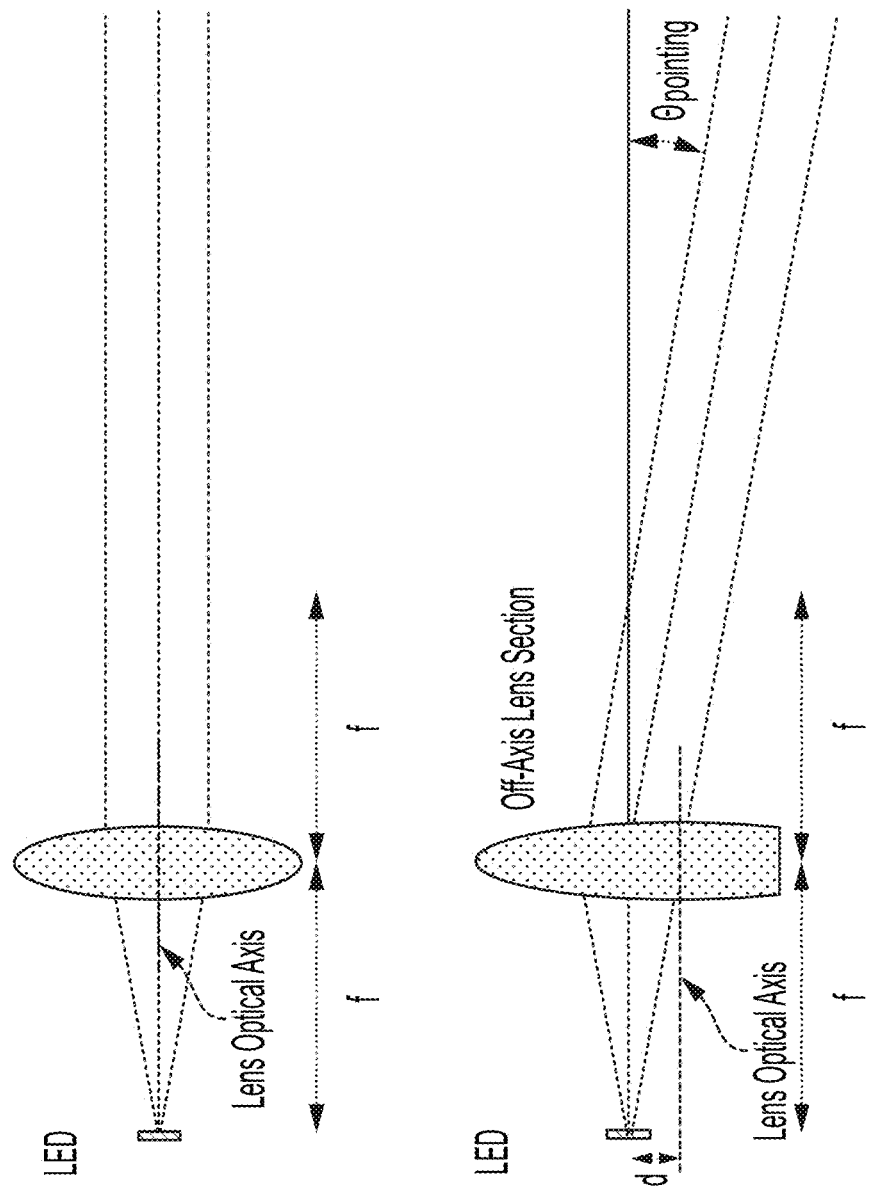
FIG. 18 is a diagram showing a light beam pointing towards off-axis lenslets in accordance with one embodiment.

As mentioned above, the exact improvement of the optical efficiency depends on the particulars of the spacer 25 and the lenslets 12. The refractive index of common glass and plastic optics is n~1.5. Focal length of hemispherical lens of radius R, $f \sim R/(n-1) \sim 2R$, and honeycomb-shaped spacer 25 is needed to eliminate stray light. For $f \sim 2R$, $f/\# \sim 1$, NA~0.5, optical efficiency ~0.25. For an LED 14 placed at front focus of lenslet 12 and positioned off-axis by distance d, the pointing angle of the exit beam is given by $\theta_{pointing}$~arctan (d/f). For an LED of diameter D, placed at the front focus of lens, the full divergence of the exit beam is given by $\theta_{divergence}$~arctan(D/f). FIG. 4 is a diagram illustrating the pointing angle and the divergence angle. Off-axis lenslet 12 sections can also be used to increase the range of angles that can be produced by light sheet 30, as can be seen with reference to FIG. 18. FIG. 18 is a diagram showing a light 14 Beam pointing towards off-axis lenslets 12 in accordance with one embodiment. Off-axis lenslet 12 sections can also be used to vary the range addressable angles across the light sheet surface.

Depending on the precise illumination pattern desired, the light emitted by the lights 14 may need to be diffused to achieve the desired qualities. In a further embodiment, in addition to the back reflector 24 and the honeycomb spacer 25, the sheet 20 can include a light diffuser 26 positioned above the microlens array 11 (relative to the orientation shown with reference to FIG. 1), facing the side of the microlens array 11 that is opposite to the side facing the LED array 13. The light diffuser 26 diffuses the light after the light passes through the lenslets 12, which helps to achieve complete diffusion of LED spots (with LED spots being. bright spots that are too bright to be comfortably viewed by the naked eye; in addition to viewing objects illuminated by the light, the lighting fixture can fall within the field of vision, which is what is commonly meant by glare). To achieve the substantially complete diffusion of the LED spots, thickness of the diffuser 26 needs to be substantially equal to the LED pitch (distance between the pixels created by the LEDs 14 in the array 13). Empirically, when the diffuser 26 thickness is between 1.5 to 2 times the LED pitch, the individual LED spots begin to be resolved but the brightness of the spots is reduced by about 25 times.

Figure 7:
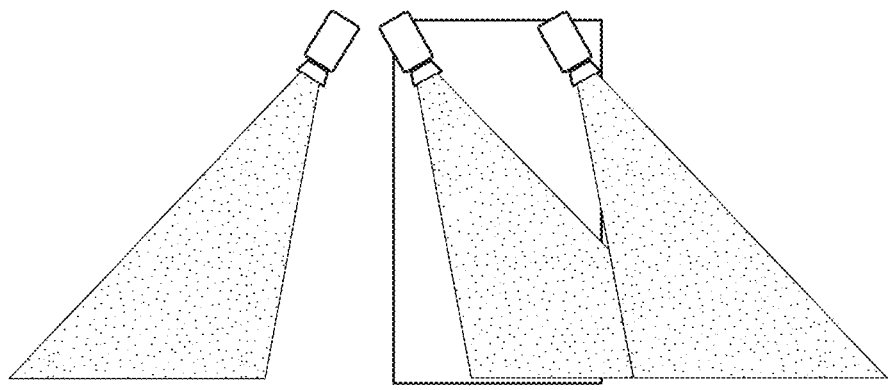
FIG. 7 illustrates an example of conventional beam steering (prior art), which has high glare and requires the use of moving mechanical parts.
Figure 8:
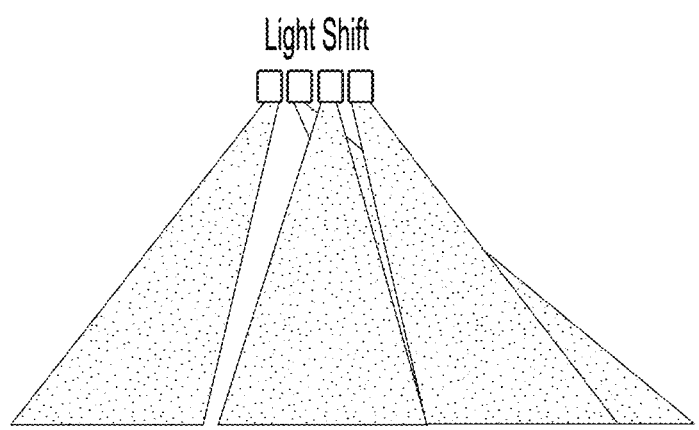
FIG. 8 illustrates an example of light shifting (prior art), which has high glare and requires the use of moving mechanical parts.
Figure 9:
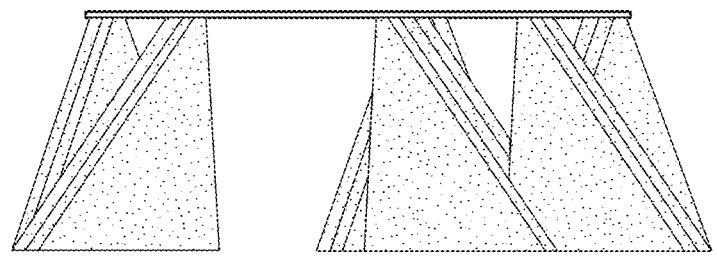
FIG. 9 is an illustration of dynamic light sheets achievable using the system, which has an improved light application efficiency (LAE) with no moving parts and lower glare compared to the techniques illustrated with reference to FIGS. 7 and 8.

As mentioned above, the illumination achieved using the system 10 can be dynamic, differentiating what is achievable from preexisting lighting technology. FIG. 7 illustrates an example of conventional beam steering (prior art), which has high glare and requires moving parts. FIG. 8 illustrates an example of light shifting (prior art), published in U.S. Department of Energy Office of Energy Efficiency & Renewable Energy, 2019 Lighting R&D opportunities, January 2020, the disclosure of which is incorporated by reference, whose glare is still far from optimal (high glare) and requires moving parts. FIG. 9 is an illustration of dynamic light sheets achievable using the system 10, which has an improved light application efficiency (LAE), with no moving parts, and lower glare compared to the techniques illustrated with reference to FIGS. 7 and 8. The dynamic light sheet is uniquely capable of digitally improving lighting application efficiency (LAE) by only delivering light to where it is needed, providing illumination that possesses the spectral content that is advantageous to the human visual system, and adjusting the light intensity at efficacious levels.

Returning to FIG. 1, the at least one computing device 16 can also be interfaced to one or more sensors 51. The sensors 51 can be located either in the proximity of the light sheet 30 or on the light sheet 30 directly. The sensors 51 can detect one or more objects in the way of the desired illumination pattern and an incomplete generation of the desired illumination pattern, thus being able to provide additional feedback regarding the illumination created by the system 10 as well any obstacles in the way of the light produced by the system 10. Such sensors 51 can include motion sensors, light sensors, and occupancy sensors, though other kinds of sensors 51 are also possible. The sensors 51 can also be other kinds of environmental sensors. For example, the sensors 51 could sense the light level in the surrounding of the light sheet 30 (such as in a room where the sheet 30 is located). The sensor 51 could also be a temperature sensor, and sense temperature either in the surrounding environment (if located in proximity to the light sheet 30) or of the light sheet 30 (if located on the light sheet 30). Similarly, a sensor 51 could be a moisture sensor sensing moisture level in the environment surrounding a light sheet 30. Still other kinds of environmental sensors are possible.

The sensors 51 could be interfaced to the at least one computing device 16 through a wired connection, a wireless connection, or a combination of wired and wireless connection (including through use of a network, such as an Internetwork such as the Internet or a cellular network). For example, if the sensors 51 are located on the light sheet 30, the sensors 51 could be interfaced to the at least one computing device 16 through wires that run proximately to the wires through which the light sheet 30 receives power, commands, or both. Likewise, the sensors 51 could be interfaced to a wireless transceiver that transmits the data 52 from the sensors to a wireless transceiver interfaced to the at least one computing device 16. Still other kinds of interfacing between the sensors 51 and the wireless transceiver are possible.

The data 52 provided by the sensors 51 can be used by the light identifier 21 to either the lights 14 that need to be turned on to either create the desired illumination pattern 20 (if the data is received before the lights 14 are first turned on) for a first time, or to remedy encountered problems in creating the desired illumination pattern 20 if the data 52 indicates that after the lights 14 have been turned on initially, the pattern 20 has not been achieved (such as due to an incorrect identification of the lights that need to be turned on) or the pattern 20 is being disrupted (such as due to obstacles that appeared in the way of the light being projected). The lights controller 15 can turn on the lights 14 identified based on the data 51.

The data 52 from the sensors 51, such as environmental sensors, can also be used by the at least one computing device 16 to modulate the intensity of the light emitted by the identified LEDs 14, and how long the lights are on. For example, if there is a high level of natural light in a room where a light sheet is located, the intensity level to create a desired illumination 20 may be higher than in a dark room. Likewise, as temperature can affect light output of an LED 14, the intensity of the emitted light can be modulated based on the sensed temperature. Further, if the temperature of a light sheet 30 exceeds a predetermined threshold, all of the lights 14 in that light sheet 30 can be turned off to avoid a possible fire danger. Similarly, as the creation of an illumination pattern 20 can be affected by moisture level (including foggy conditions), the intensity of the emitted light 16 can be modulated based on the sensed moisture level. Thus, due to having a feedback mechanisms, the system 10 can function programmatically and autonomously, being able to maintain a desired illumination pattern without continued human input.

As mentioned above, while the one or more computing devices 16 are shown as a server, other types of computer devices are possible. The computing devices 16 can include one or more modules for carrying out the embodiments disclosed herein. The modules can be implemented as a computer program or procedure written as source code in a conventional programming language and is presented for execution by the processors as object or byte code. Alternatively, the modules could also be implemented in hardware, either as integrated circuitry or burned into read-only memory components, and each of the computing devices 16 can act as a specialized computer. For instance, when the modules are implemented as hardware, that particular hardware is specialized to perform the computations and communication described above and other computers cannot be used. Additionally, when the modules are burned into read-only memory components, the computer storing the read-only memory becomes specialized to perform the operations described above that other computers cannot. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components. For example, the computing device 16 can include other components found in programmable computing devices, such as input/output ports, network interfaces, and non-volatile storage, although other components are possible. In the embodiment where the computing devices 16 are servers, the server can also be cloud-based or be dedicated servers.

Figure 14:
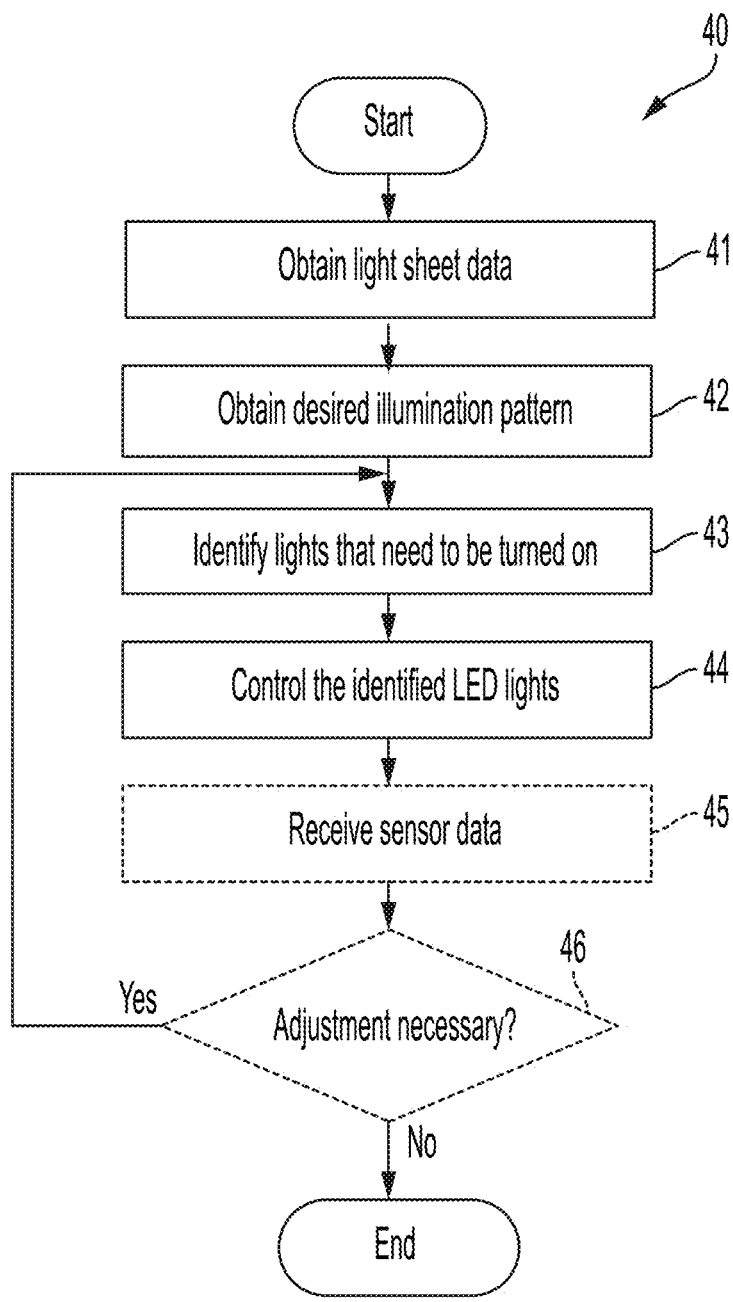
FIG. 14 is a flow diagram showing a method for light field illuminator sheet-based dynamic lighting control in accordance with one embodiment.

The digital control of individual LEDs 14 allows customization of the lighting provided to the particular environment in which the lighting is provided. FIG. 14 is a flow diagram showing a method 40 for light field illuminator sheet-based dynamic lighting control in accordance with one embodiment. The method 40 can be implemented using the system 10 of FIG. 1. Initially, light sheet data 32, including the microlens array data 18 and the light array data, is obtained (step 41). Desired illumination pattern 20 is obtained, such as through being received from a user (step 42). Which of the lights 14 need to be turned on, for what duration, and at what time, is determined using the light sheet data 32, the desired illumination pattern 20, and optionally data 52 from one or more sensors 51, as also described above with reference to FIG. 1 (step 43). The lights 14 are turned on and off based on the determination (step 44). Optionally, data 52 from one or more sensors 51 is received by the one or more computing devices 16 (step 45) and if an adjustment of which lights 14 are turned on is necessary as determined based on the data (step 46), the method 40 returns to step 43. If no adjustment is necessary (step 46), the method 40 ends.

Figure 16B:
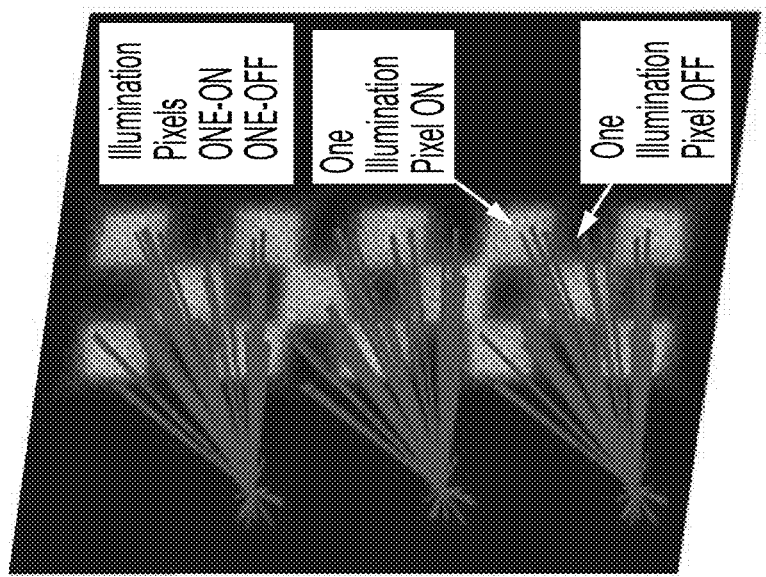
FIGS. 16A-16B are diagrams illustrating simulated illumination patterns achievable with three light sheet tiles of FIGS. 15A-15B.
Figure 16A:
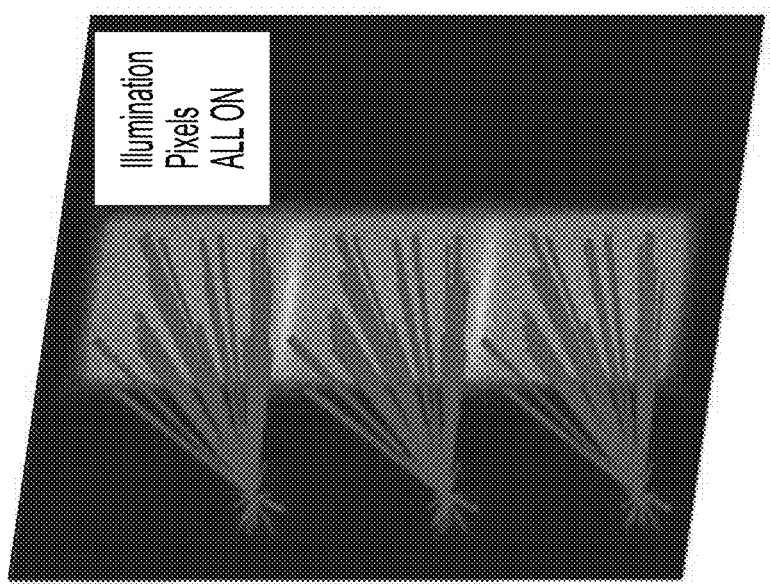
Figure 17A:
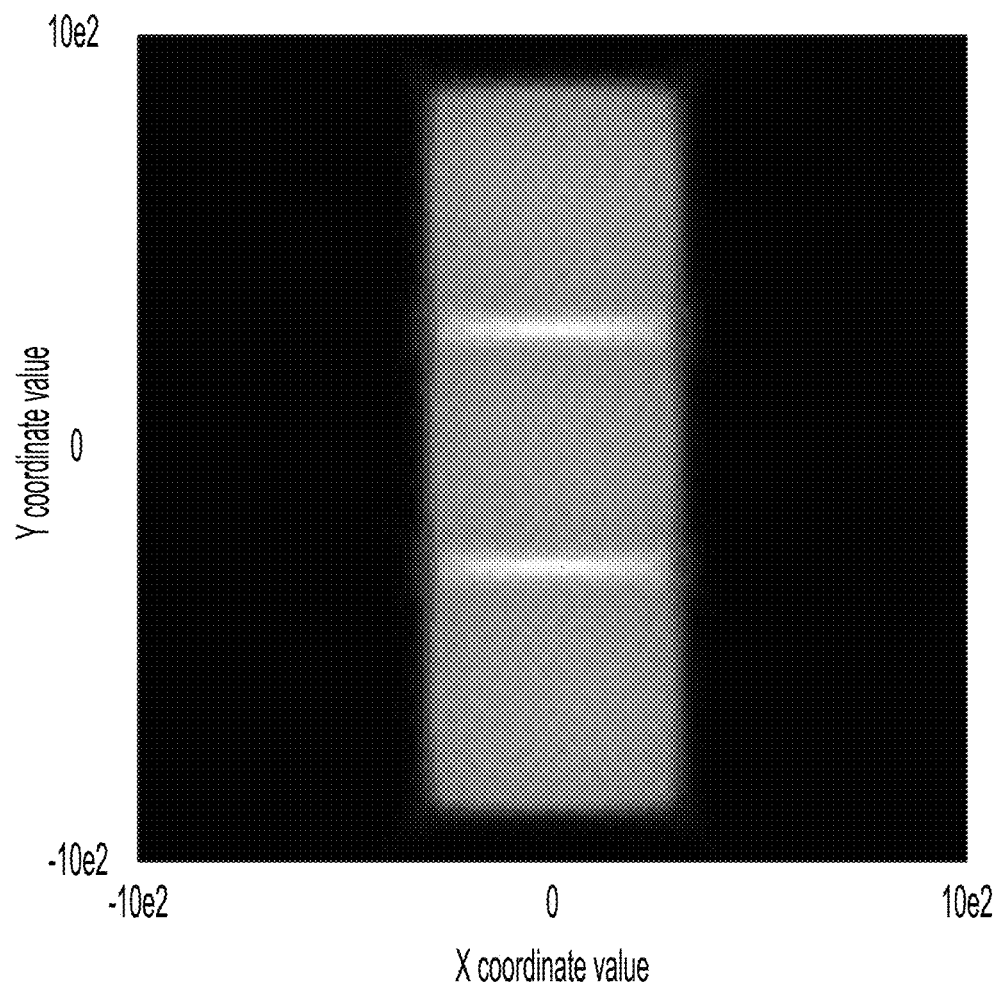
FIGS. 17A-17B show simulated patterns, adjusted for human visual brightness perception, achieved when all of the lights in the sheet are on (FIG. 17A) and when only a subset of the lights necessary to produce the checkerboard-like pattern are on (FIG. 17B).
Figure 17B:
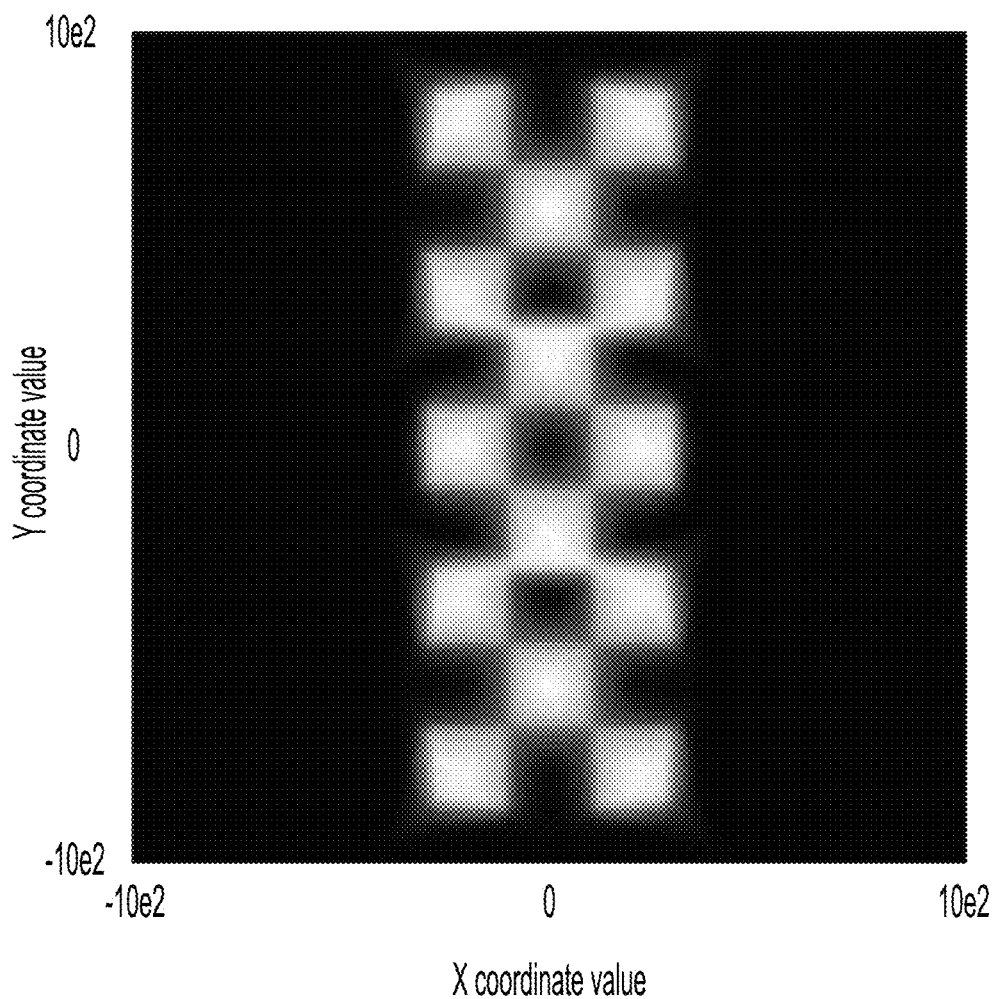

The system 10 and method 40 allow to achieve a high light application efficiency and increased control over the provided light, as can be seen from FIGS. 15A-15B and 16A-16B, which describe simulations of illumination achievable using a particular light sheet tile 30. FIGS. 15A-15B are diagrams describing details of the particular light sheet tiles used for an illumination simulation. FIGS. 16A-16B are diagrams illustrating the illumination patterns simulated achievable with three light sheet tiles 30 of FIGS. 15A-15B. The sheet 30 shown with reference to FIGS. 15A-15B includes an absorbing spacer 25. Using a reflective spacer 25 can help to extract more light, but can also cause undesirable artifacts. FIGS. 17A-17B show simulated patterns, adjusted for human visual brightness perception, achieved when all of the lights 14 in the sheet 30 are on (FIG. 17A) and when only a subset of the lights 14 necessary to produce the checkerboard-like pattern are on (FIG. 17B). The sheet 30 simulated with reference to FIGS. 17A-17B includes reflective spacers 25. The reflective spacers 25 extract more light but produce artifacts. However, since the lighting sheet 30 produces diffuse illumination (as opposed to images), the artifacts would be blended in a way that is acceptable. FIG. 6I is an illustration of a ray trace with a presence of a low-level artifact created by a small section of the sheet. As is illustrated by FIG. 6I, such artifacts are relatively imperceptible.

The simulations shown with reference to FIGS. 12A, 12B, 13A, 13B, 16A, 16B, 17A, and 17B use three tiles 30 to illustrate the tiles' 30 basic capabilities and to make the simulation computationally tractable. However, the space and area between and around the tiles 30 could be filled with other tiles 30 making a large area contiguous sheet, which allows to obtain much more smoothly varying and subtly changing illumination patterns, angular content, spectral content, and greater number of intensity levels will be obtainable.

While the invention has been particularly shown and described as referenced to the embodiments thereof, those skilled in the art will understand that the foregoing and other changes in form and detail may be made therein without departing from the spirit and scope of the invention.

What is claimed is:

1. A system for light field illuminator sheet-based dynamic lighting output, comprising:
   a microlens array comprises a plurality of lenslets;
      an array of light-emitting diode (LED) lights aligned with each of the lenslets, wherein at least some of the LED lights in one or more of the arrays are positioned at an angle and off-axis relative to the optical axis of the lenslet with which that array is aligned and at a position different from a position relative to the optical axis at which at least one of the remaining LED lights in that array is positioned; a computer in control of each of the LED lights, the computer comprising at least one processor, the computer configured to:
      obtain a desired illumination pattern comprising at least one of a desired far-field illumination pattern and a desired light field distribution;
      identify based on the angles associated with the LED lights those of the LED lights that need to be turned on to generate the desired illumination pattern; and
      control the identified LED lights to generate the desired illumination pattern.

2. A light-emitting diode illuminator sheet assembly according to claim 1, wherein at least one of:
   the lenslets comprise one or more of refractive elements, off-axis elements, fresnel elements, holographic optical elements, and diffractive optical elements; and
   at least some of the LED lights have different spectral characteristics from other LED lights.

3. A light-emitting diode illuminator sheet assembly according to claim 1, further comprising a pyramidal reflective honeycomb spacer positioned between the microlens array and the LED light array.

4. A light-emitting diode illuminator sheet assembly according to claim 3, wherein the spacer is coated with a coating comprising at least one of aluminum and silver.

5. A light-emitting diode illuminator sheet assembly according to claim 1, further comprising:
a back reflector positioned on a side of the LED light array opposite to the side that faces the microlens array.

6. A light-emitting diode illuminator sheet assembly according to claim 5, wherein the reflector is coated with a coating comprising at least one of aluminum and silver.

7. A light-emitting diode illuminator sheet assembly according to claim 1, a light diffuser sheet positioned on a side of the microlens array opposite to a side of the microlens array that faces the LED light array.

8. A light-emitting diode illuminator sheet assembly according to claim 1, wherein a thickness of the light diffuser is substantially equal to a pitch of the identified LED lights.

9. A light-emitting diode illuminator sheet assembly according to claim 1, wherein the lenslets are near-hemispherical.

10. A light-emitting diode illuminator sheet assembly according to claim 1, further comprising:
at least one sensor interfaced to the computer, the at least one sensor configured to capture data regarding at least one of one or more objects in the way of the desired illumination pattern, an incomplete generation of the desired illumination pattern, and environmental conditions surrounding the sensor; and
the computer configured to at least one of modify the identified LED lights and control an operation of the identified LED lights based on the sensor data.

11. A method for light field illuminator sheet-based dynamic lighting output, comprising steps of:
obtaining data regarding a light-emitting sheet assembly, the light emitting sheet assembly comprising a microlens array comprising a plurality of lenslets, the light emitting sheet assembly further comprising an array of light-emitting diode (LED) lights aligned with each of the lenslets, wherein at least some of the LED lights in one or more of the arrays are positioned at an angle and off-axis relative to the optical axis of the lenslet with which that array is aligned and at a position different from a position relative to the optical axis at which at least one of the remaining LED lights in that array is positioned;
obtain a desired illumination pattern comprising at least one of a desired far-field illumination pattern and a desired light field distribution;
identifying based on the angles associated with the LED lights those of the LED lights that need to be turned on to generate the desired illumination pattern; and
controlling the identified LED lights to generate the desired illumination pattern,
wherein the steps are performed by a suitably-programmed computer.

12. A method according to claim 11, wherein at least one of:
the lenslets comprise one or more of refractive elements, off-axis elements, fresnel elements, holographic optical elements, and diffractive optical elements; and
at least some of the LED lights have different spectral characteristics from other LED lights.

13. A method according to claim 11, the light emitting sheet assembly further comprising a pyramidal reflective honeycomb spacer positioned between the microlens array and the LED light array.

14. A method according claim 13, wherein the spacer is coated with a coating comprising at least one of aluminum and silver.

15. A method according to claim 11, the light emitting sheet assembly further comprising a back reflector positioned on a side of the LED light array opposite to the side that faces the microlens array.

16. A method according to claim 15, wherein the reflector is coated with a coating comprising at least one of aluminum and silver.

17. A method according to claim 11, the light emitting sheet assembly further comprising a light diffuser sheet positioned on a side of the microlens array opposite to a side of the microlens array that faces the LED light array.

18. A method according to claim 17, wherein a thickness of the light diffuser is substantially equal to a pitch of the identified LED lights.

19. A method according to claim 17, wherein the lenslets are near-hemispherical.

20. A method according to claim 11, further comprising:
detecting by at least one sensor interfaced to the computer data regarding at least one of one or more objects in the way of the desired illumination pattern, an incomplete generation of the desired illumination pattern, and environmental conditions surrounding the sensor;
performing by the computer at least one of: modifying by the computer the identified LED lights based on the data and controlling operation of the identified LED lights based on the data.

* * * * *